(12) United States Patent
Mun

(10) Patent No.: US 12,505,891 B2
(45) Date of Patent: Dec. 23, 2025

(54) SEMICONDUCTOR MEMORY DEVICE PERFORMING PROGRAM OPERATION AND OPERATING METHOD OF THE SEMICONDUCTOR MEMORY DEVICE

(71) Applicant: SK hynix Inc., Icheon-si (KR)

(72) Inventor: Yeong Jo Mun, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 198 days.

(21) Appl. No.: 18/363,522

(22) Filed: Aug. 1, 2023

(65) Prior Publication Data

US 2024/0265981 A1 Aug. 8, 2024

(30) Foreign Application Priority Data

Feb. 3, 2023 (KR) .................. 10-2023-0015044

(51) Int. Cl.
| | | |
|---|---|---|
| *G11C 16/34* | (2006.01) | |
| *G11C 11/56* | (2006.01) | |
| *G11C 16/04* | (2006.01) | |
| *G11C 16/10* | (2006.01) | |
| *G11C 16/24* | (2006.01) | |
| *G11C 16/26* | (2006.01) | |

(52) U.S. Cl.
CPC ...... *G11C 16/3427* (2013.01); *G11C 11/5628* (2013.01); *G11C 16/0483* (2013.01); *G11C 16/10* (2013.01); *G11C 16/24* (2013.01); *G11C 16/26* (2013.01); *G11C 16/3418* (2013.01); *G11C 16/3459* (2013.01)

(58) Field of Classification Search
CPC . G11C 16/3427; G11C 16/0483; G11C 16/10; G11C 16/24; G11C 16/3459; G11C 11/5628; G11C 16/08; G11C 16/3404; G11C 16/26; G11C 16/3418
See application file for complete search history.

(56) References Cited

U.S. PATENT DOCUMENTS

| | | | |
|---|---|---|---|
| 7,894,269 B2 | 2/2011 | Li | |
| 10,896,734 B2 * | 1/2021 | Yang | ................ G11C 16/0483 |
| 12,230,341 B2 * | 2/2025 | Choi | ................ G06F 3/0659 |
| 2007/0002615 A1 * | 1/2007 | Lee | ................ G11C 16/3459 |
| | | | 365/185.03 |

(Continued)

FOREIGN PATENT DOCUMENTS

| | | |
|---|---|---|
| KR | 1020100085672 A | 7/2010 |
| KR | 1020120009925 A | 2/2012 |
| KR | 1020190032904 A | 3/2019 |

*Primary Examiner* — Amir Zarabian
*Assistant Examiner* — Justin Bryce Heisterkamp
(74) *Attorney, Agent, or Firm* — WILLIAM PARK AND ASSOCIATES LTD.

(57) ABSTRACT

A semiconductor memory device includes: a memory cell array including a plurality of memory cells; a peripheral circuit including a plurality of page buffers each performing an auxiliary verify operation and a main verify operation, which are used to program selected memory cells among the plurality of memory cells; and control logic for controlling the auxiliary verify operation and the main verify operation of the peripheral circuit. During the main verify operation, the control logic controls the peripheral circuit to selectively precharge sensing nodes of the plurality page buffers respectively corresponding to the selected memory cells, based on a result of the auxiliary verify operation.

19 Claims, 17 Drawing Sheets

(56) References Cited

U.S. PATENT DOCUMENTS

| | | | |
|---|---|---|---|
| 2017/0069389 A1* | 3/2017 | Park | G11C 16/14 |
| 2021/0065812 A1* | 3/2021 | An | G11C 16/3459 |
| 2021/0407606 A1* | 12/2021 | Choi | G11C 16/3459 |
| 2022/0044730 A1* | 2/2022 | Kim | G11C 16/10 |
| 2022/0051714 A1* | 2/2022 | Bang | G11C 16/3418 |
| 2022/0230691 A1* | 7/2022 | Choi | G11C 11/5628 |
| 2023/0386539 A1* | 11/2023 | Cho | G11C 16/3481 |
| 2023/0409214 A1* | 12/2023 | Choi | G06F 3/0653 |
| 2024/0120008 A1* | 4/2024 | Choi | G11C 16/24 |
| 2024/0145013 A1* | 5/2024 | Cho | G11C 16/24 |

* cited by examiner

SEMICONDUCTOR MEMORY DEVICE PERFORMING PROGRAM OPERATION AND OPERATING METHOD OF THE SEMICONDUCTOR MEMORY DEVICE

CROSS-REFERENCE TO RELATED APPLICATION

The present application claims priority under 35 U.S.C. § 119(a) to Korean patent application number 10-2023-0015044 filed on Feb. 3, 2023, in the Korean Intellectual Property Office, the entire disclosure of which is incorporated by reference herein.

BACKGROUND

1. Technical Field

The present disclosure generally relates to an electronic device, and more particularly, to a semiconductor memory device configured to perform a program operation, and an operating method of the semiconductor memory device.

2. Related Art

A semiconductor memory device may be formed in a two-dimensional structure in which strings are arranged horizontally to a semiconductor substrate, or be formed in a three-dimensional structure in which strings are arranged vertically to a semiconductor substrate. A three-dimensional memory device is a memory device devised to overcome the limit of degree of integration of two-dimensional semiconductor memory devices, and may include a plurality of memory cells vertically stacked above a semiconductor substrate.

In a program operation of selected memory cells, a plurality of program loops are performed on the selected memory cells. Each of the program loops may include a program operation and a verify operation.

SUMMARY

In accordance with an embodiment of the present disclosure, there may be provided a semiconductor memory device including: a memory cell array including a plurality of memory cells; a peripheral circuit including a plurality of page buffers each performing an auxiliary verify operation and a main verify operation, which are used to program selected memory cells among the plurality of memory cells; and control logic configured to control the auxiliary verify operation and the main verify operation of the peripheral circuit, wherein, during the main verify operation, the control logic controls the peripheral circuit to selectively precharge sensing nodes of the plurality page buffers respectively corresponding to the selected memory cells, based on a result of the auxiliary verify operation.

In accordance with an embodiment of the present disclosure, there may be provided a method of operating a semiconductor memory device, the method including: performing an auxiliary verify operation on memory cells to be programmed to a target program state among memory cells selected as a program target by using an auxiliary verify voltage; and performing a main verify operation on the memory cells to be programmed to the target program state by using a main verify voltage higher than the auxiliary verify voltage, wherein the performing of the main verify operation includes selectively precharging sensing nodes of a plurality of page buffers respectively corresponding to the memory cells to be programmed to the target program state, based on a result of the auxiliary verify operation.

In accordance with an embodiment of the present disclosure, there may be provided a semiconductor memory device including: a memory cell array including a plurality of memory cells; a peripheral circuit connected to the plurality of memory cells through bit lines, the peripheral circuit including a plurality of page buffers performing a program operation on selected memory cells among the plurality of memory cells; and control logic configured to control the program operation of the peripheral circuit, wherein, during the program operation, the control logic controls the peripheral circuit to divide memory cells corresponding to an erase state among the selected memory cells into first memory cells having a threshold voltage lower than a test voltage and second memory cells having a threshold voltage higher than the test voltage by performing a sensing operation using the test voltage, precharge bit lines connected to the first memory cells to a first voltage level, precharge bit lines connected to the second memory cells to a second voltage level higher than the first voltage level, and apply a program voltage to a word line connected to the selected memory cells.

BRIEF DESCRIPTION OF THE DRAWINGS

Examples of embodiments will now be described more fully hereinafter with reference to the accompanying drawings; however, they may be embodied in different forms and should not be construed as limited to the embodiments set forth herein.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

In a program operation of selected memory cells, a plurality of program loops are performed on the selected memory cells. Each of the program loops may include an auxiliary verify operation and a main verify operation. The auxiliary verify operation includes an operation of sensing a threshold voltage of memory cells by using an auxiliary verify voltage lower than a main verify voltage. In an embodiment, a bit line voltage of memory cells having a threshold voltage between the auxiliary verify voltage and the main verify voltage is controlled, so that a threshold voltage distribution characteristic of memory cells, which is formed by the program operation, can be improved.

Various embodiments provide a semiconductor memory device and an operating of the semiconductor memory device, which can improve sensing accuracy in a verify process of a program operation.

Various embodiments also provide a semiconductor memory device and an operating method of the semiconductor memory device, which can reduce disturbance of a program operation.

Figure 1:
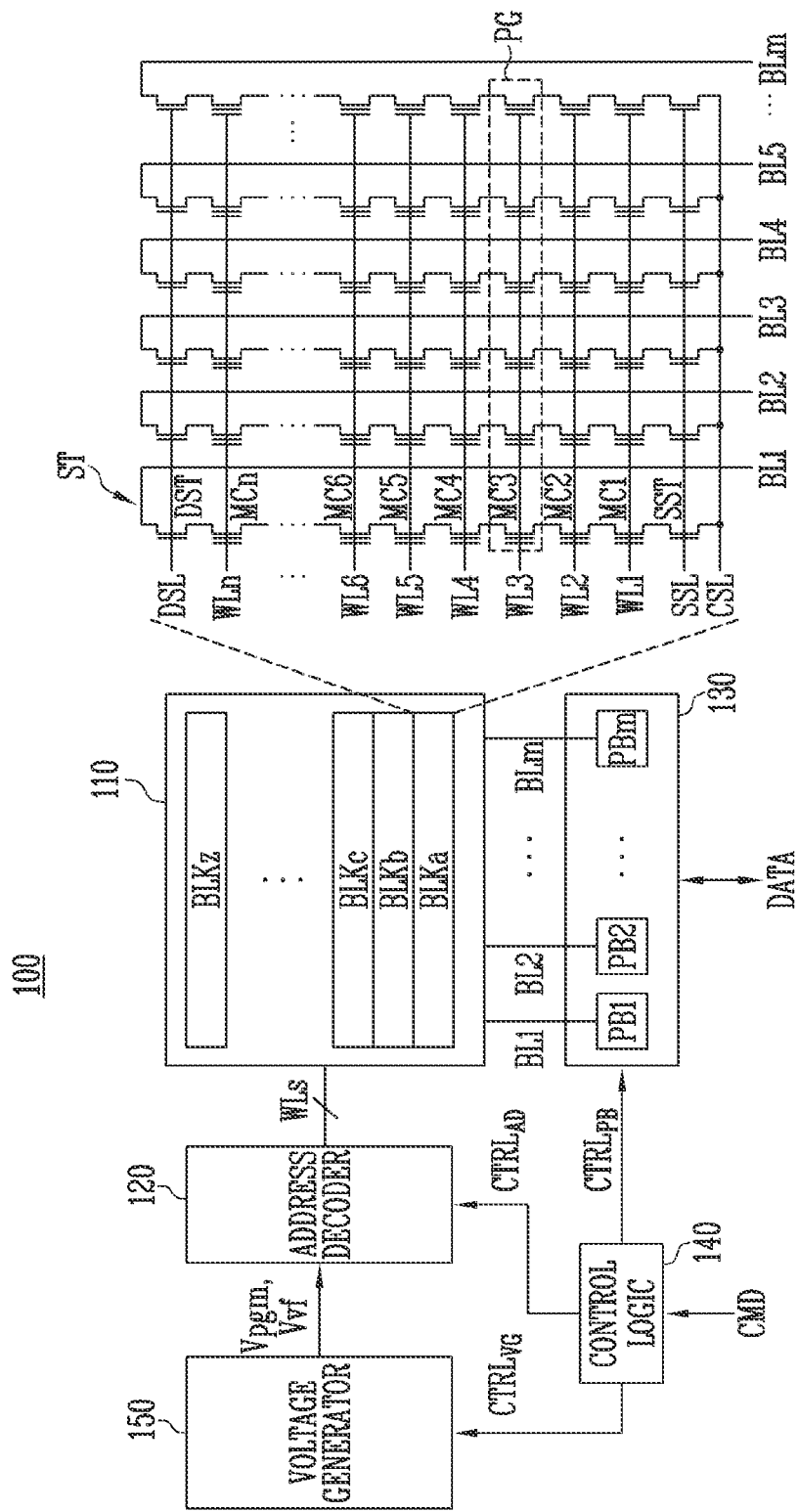
FIG. 1 is a block diagram illustrating a semiconductor memory device in accordance with an embodiment of the present disclosure.

FIG. 1 is a block diagram illustrating a semiconductor memory device in accordance with an embodiment of the present disclosure.

Referring to FIG. 1, the semiconductor memory device 100 may include a memory cell array 110, an address decoder 120, a read/write circuit 130, control logic 140, and a voltage generator 150. The control logic 140 may be implemented as hardware, software, or a combination of hardware and software. For example, the control logic 140 may be a control logic circuit operating in accordance with an algorithm and/or a processor executing control logic code.

The memory cell array 110 includes a plurality of memory blocks BLKa to BLKz. The plurality of memory blocks BLKa to BLKz are connected to the address decoder 120 through word lines WLs. The plurality of memory blocks BLKa to BLKz are connected to the read/write circuit 130 through bit lines BL1 to BLm. Each of the plurality of memory blocks BLKa to BLKz includes a plurality of memory cells. In an embodiment, the plurality of memory cells may be configured as nonvolatile memory cells.

A structure of a memory block BLKa among the plurality of memory blocks BLKa to BLKz included in the memory cell array 110 is illustrated in FIG. 1. Referring to FIG. 1, a plurality of word lines WL1 to WLn arranged in parallel to each other may be connected between a drain select line DSL and a source select line SSL. More specifically, the memory block BLKa may include a plurality of strings ST connected between the bit lines BL1 to BLm and a common source line CSL. The bit lines BL1 to BLm may be respectively connected to corresponding strings ST. The common source line CSL may be commonly connected to the strings ST. The strings ST may be configured identically to one another, and therefore, a string ST connected to a first bit line BL1 will be described in detail as an example.

The string ST may include a source select transistor SST, a plurality of memory cells MC1 to MCn, and a drain select transistor DST, which are connected in series to each other between the common source line CSL and the first bit line BL1. At least one source select transistor SST and at least one drain select transistor DST may be included in one string ST.

A source of the source select transistor SST may be connected to the common source line CSL, and a drain of the drain select transistor DST may be connected to the first bit line BL1. The memory cells MC1 to MCn may be connected in series between the source select transistor SST and the drain select transistor DST. Gates of source select transistors SST included in different strings ST may be connected to the source select line SSL, gates of drain select transistors DST of the different strings ST may be connected to the drain select line DSL, and gates of memory cells MC1 to MCn of the different strings ST may be connected to the plurality of word lines WL1 to WLn. A group of memory cells connected to the same word line among the memory cells included in the different strings ST may be referred to as a physical page PG. Therefore, physical pages PG of which number corresponds to the number of the word lines WL1 to WLn may be included in the memory block BLKa.

One memory cell may store one-bit data. This is generally designated as a single level cell (SLC). One physical page PG may store one logical page (LPG) data. One LPG data may include data bits of which number corresponds to the number of cells included in one physical page PG.

Meanwhile, one memory cell may store two-or-more-bit data. One physical page PG may store two or more LPG data.

Although the structure of a two-dimensional memory block is illustrated in FIG. 1, the present disclosure is not limited thereto. That is, each of the memory blocks BLKa to BLKz shown in FIG. 1 may be configured as a three-dimensional memory block.

The address decoder 120, the read/write circuit 130, and the voltage generator 150 operate as a peripheral circuit for driving the memory cell array 110. The peripheral circuit may perform a read operation, a write operation, and an erase operation on the memory cell array 110 under the control of the control logic 140. The address decoder 120 is connected to the memory cell array 110 through word lines WLs. The address decoder 120 is operated under the control of the control logic 140. Specifically, the control logic 140 transfers an address decoding control signal $CTRL_{AD}$ to the address decoder 120, and the address decoder 120 performs a decoding operation, based on the address decoding control signal $CTRL_{AD}$.

Also, in a program operation, the address decoder 120 may apply a program voltage VPGM generated in the voltage generator 150 to a selected word line, and apply a program pass voltage to the other unselected word lines. Also, in a program verify operation, the address decoder 120 may apply a verify voltage Vvf generated in the voltage generator 150 to the selected word line, and apply a verify pass voltage to the other unselected word lines.

The read/write circuit 130 includes a plurality of page buffers PB1 to PBm. The read/write circuit 130 may operate as a "read circuit" in a read operation, and operate as a "write circuit" in a write operation. The plurality of page buffers PB1 to PBm are connected to the memory cell array 110 through the bit lines BL1 to BLm. The read/write circuit 130 performs a read operation on received data DATA in response to a page buffer control signal $CTRL_{PB}$ output from the control logic 140.

The control logic 140 is connected to the address decoder 120, the read/write circuit 130, and the voltage generator 150. The control logic 140 may receive a command CMD from the outside. The control logic 140 may control the address decoder 120, the read/write circuit 130, and the voltage generator 150 to perform an operation corresponding to the received command CMD. That is, the control logic 140 may control an operation of the voltage generator 150 through a voltage generation control signal $CTRL_{VG}$. Also, the control logic 140 may control an operation of the address decoder 120 through the address decoding control signal $CTRL_{AD}$. Meanwhile, the control logic 140 may control operations of the page buffers PB1 to PBm in the read/write circuit 130 through the page buffer control signal $CTRL_{PB}$.

The voltage generator 150 may generate various operating voltages in response to a voltage generation control signal $CTRL_{VG}$ output from the control logic 140. For example, the voltage generator 150 may generate the program voltage VPGM used for a program operation and the verify voltage Vvf used for a program verify operation. Also, the voltage generator 150 may generate the program pass voltage and the verify pass voltage.

According to the semiconductor memory device 100 in accordance with an embodiment of the present disclosure, an auxiliary verify operation and a main verify operation are performed on selected memory cells during a program operation. In an embodiment, during the auxiliary verify operation, sensing nodes of a plurality of page buffers may be collectively precharged. Meanwhile, during the main verify operation, in an embodiment, the sensing nodes of the plurality of page buffers may be selectively precharged based on a result of the auxiliary verify operation.

Figure 2:
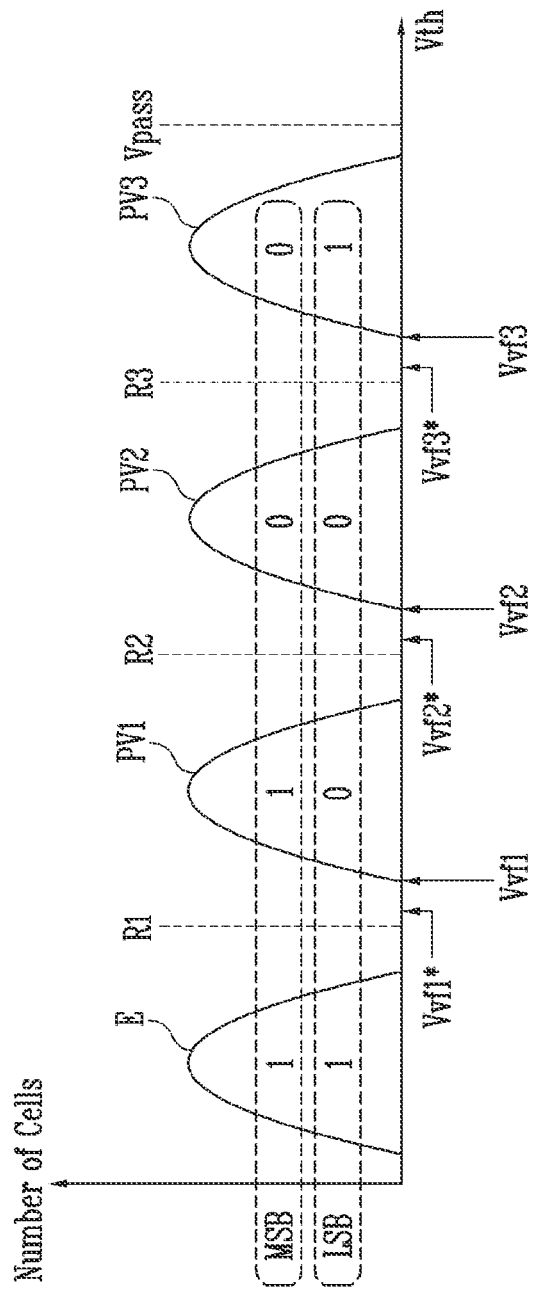
FIG. 2 is a diagram illustrating a threshold voltage distribution of multi-level cells (MLCs), and a main verify voltage and an auxiliary verify voltage, which are used to form the same.

FIG. 2 is a diagram illustrating a threshold voltage distribution of multi-level cells (MLCs), and a main verify voltage and an auxiliary verify voltage, which are used to form the same.

Referring to FIG. 2, a data pattern stored in an MLC and a threshold voltage distribution of target states corresponding thereto are illustrated for example. The MLC stores two-bit data including a Most Significant Bit (MSB) and a Least Significant Bit (LSB). In the example shown in FIG. 3, a memory cell corresponding to an erase state E may store a data pattern of "11," a memory cells corresponding to a first program state PV1 may store a data pattern of "10," a memory cell corresponding to a second program state PV2 may store a data pattern of "00," and a memory cell corresponding to a third program state PV3 may store a data pattern of "01." Meanwhile, the pass voltage Vpass may be applied to an unselected word line.

In a program verify operation, a main verify voltage Vvf1, Vvf2, and Vvf3 and an auxiliary verify voltage Vvf1*, Vvf2*, and Vvf3* may be used. The auxiliary verify voltage Vvf1*, Vvf2*, and Vvf3* may be a voltage for distinguishing memory cells in the vicinity of a main verify voltage Vvf1, Vvf2, and Vvf3 corresponding to a target state. A threshold voltage movement width of the memory cells in the vicinity of the main verify voltage Vvf1, Vvf2, and Vvf3 is decreased, so that the threshold voltage distribution width of each of the program states PV1, PV2, and PV3 can be narrowed. Also illustrated in FIG. 2 are first, second, and third read voltages R1, R2, and R3, respectively.

More specifically, a first program allow voltage is applied to a bit line connected to memory cells having a threshold voltage lower than a first auxiliary verify voltage Vvf1* among memory cells to be programmed to the first program state PV1. In an embodiment, the first program allow voltage may be a ground voltage. Meanwhile, a second program allow voltage is applied to a bit line connected to memory cells having a threshold voltage which is higher than the first auxiliary verify voltage Vvf1* and is lower than a first main verify voltage Vvf1 among the memory cells to be programmed to the first program state PV1. In an embodiment, the second program allow voltage may be a voltage higher than the first program allow voltage. In addition, a program inhibit voltage is applied to a bit line connected to memory cells having a threshold voltage higher than the main verify voltage Vvf1 among the memory cells to be programmed to the first program state PV1. The program inhibit voltage is a voltage higher than the second program allow voltage. In an embodiment, the program inhibit voltage may be a power voltage.

While a program voltage is applied to a selected word line, the threshold voltage of the memory cells connected to the bit line to which the program inhibit voltage is applied is maintained. Meanwhile, while the program voltage is applied to the selected word line, a threshold voltage movement width of the memory cells connected to the bit line to which the second program allow voltage is applied is smaller than a threshold voltage movement width of the memory cells connected to the bit line to which the first program allow voltage is applied. Accordingly, the threshold voltage movement width of memory cells in the vicinity of the first main verify voltage Vvf1 is decreased, so that the threshold voltage distribution width of the memory cells programmed to the first program state PV1 can be narrowed.

In the above, the first program state PV1 has been described as an example. However, a program operation on the second and third program states PV2 and PV3 may be performed in the same manner.

Hereinafter, for convenience of description, a semiconductor memory device and an operation thereof in accordance with the present disclosure will be described based on a program operation on the MLC. However, the present disclosure is not limited thereto, and the semiconductor memory device and the operation thereof may be applied to program operations of a single-level cell (SLC), a triple-level cell (TLC), and the like.

Figure 3:
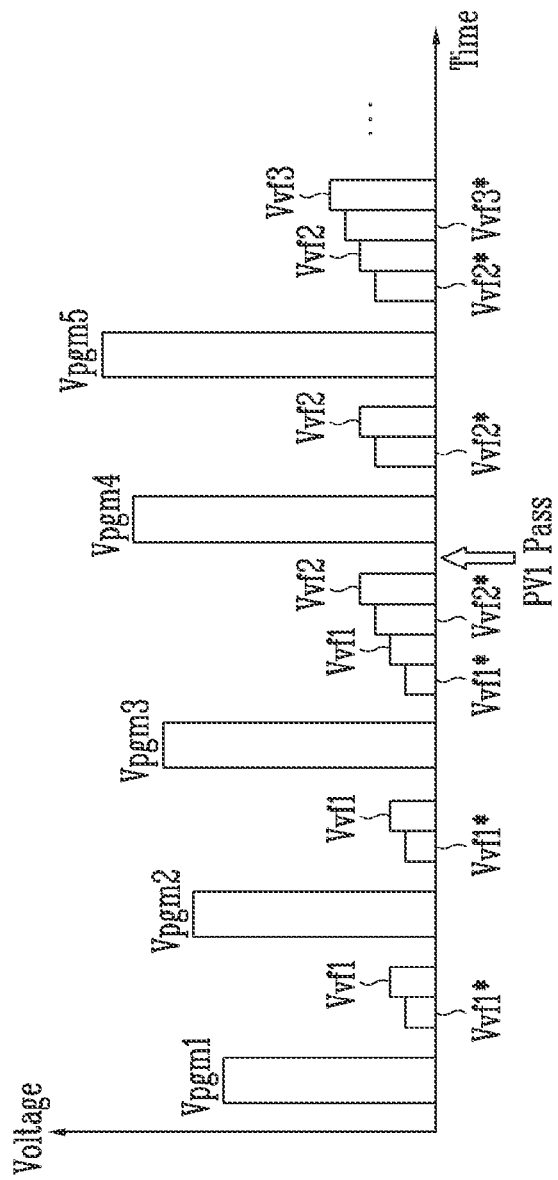
FIG. 3 is a diagram illustrating a voltage applied to a selected word line in a program operation.

FIG. 3 is a diagram illustrating a voltage applied to a selected word line in a program operation.

Referring to FIG. 3, the program operation for forming the program state shown in FIG. 2 may include a plurality of program loops. A plurality of program loops may be repeatedly performed until memory cells included in a selected page are completely programmed or until a maximum program loop is performed.

Meanwhile, the program operation of the semiconductor memory device may be performed using an Incremental Step Pulse Programming (ISPP) method. The ISPP method is a method of programming memory cells while gradually increasing a program voltage. Whenever a number of times a program loop is performed is repeated, a program voltage applied in each program loop may increase or gradually increase.

Meanwhile, each of the plurality of program loops may include a program pulse apply phase and a program verify phase. In the program pulse apply phase, a program voltage may be applied to a selected word line, thereby increasing a threshold voltage of program allow cell.

In the program verify phase, it may be verified whether memory cells selected as a program target have been programmed to a voltage having a desired level (hereinafter, referred to as a 'reference voltage') or higher. As a result of a verify operation, a memory cell which is not programmed to the reference voltage or higher may be operated as a program allow cell in a next program loop. A program pulse having a high voltage level as compared with a previous program loop may be applied to program allow cells. Meanwhile, a memory cell programmed to the reference voltage or higher may be operated as a program inhibit cell in a next program loop. Although a program pulse is applied to the selected word line, a threshold voltage of the program inhibit cell might not increase.

As described above, the main verify voltage Vvf1, Vvf2, and Vvf3 and the auxiliary verify voltage Vvf1*, Vvf2*, and Vvf3* may be used in the program verify phase. The auxiliary verify voltage Vvf1*, Vvf2*, and Vvf3* may be a voltage for distinguishing memory cells in the vicinity of a main verify voltage Vvf1, Vvf2, and Vvf3 corresponding to a target state. As shown in FIG. 3, in the program verify phase, the first auxiliary verify voltage Vvf1*, the first main verify voltage Vvf1, a second auxiliary verify voltage Vvf2*, a second main verify voltage Vvf2, a third auxiliary verify voltage Vvf3*, and a third main verify voltage Vvf3 may be sequentially applied to the selected word line. However, this is merely illustrative, and only some of the first auxiliary verify voltage Vvf1*, the first main verify voltage Vvf1, the second auxiliary verify voltage Vvf2*, the second main verify voltage Vvf2, the third auxiliary verify voltage Vvf3*, and the third main verify voltage Vvf3 may be used in a program verify phase included in each program loop.

For example, any memory cells programmed to the second and third program states might not exist in an early stage of the program operation. Accordingly, in a first program loop 1$^{st}$ PGM Loop, the verify operation may be performed using only the first auxiliary verify voltage Vvf1* and the first main verify voltage Vvf1. Meanwhile, as the program operation is performed, when threshold voltages of memory cells to be programmed to the first program state PV1 are all higher than the first main verify voltage Vvf1, this is a state in which verification on the first program state PV1 passes. In a subsequent program loop, the first auxiliary verify voltage Vvf1* and the first main verify voltage Vvf1 might not be used.

Referring to FIG. 3, in a program pulse apply phase of a first program loop, a first program voltage Vpgm1 may be applied to a selected word line. Also, in a verify phase of the first program loop, the first auxiliary verify voltage Vvf1* and the first main verify voltage Vvf1 may be applied to the selected word line. As described above, any memory cells programmed to the second and third program states might not exist in an early stage of the program operation. Accordingly, in the first program loop 1$^{st}$ PGM Loop, the verify operation may be performed using only the first auxiliary verify voltage Vvf1* and the first main verify voltage Vvf1.

After that, in a program pulse apply phase of a second program loop, a second program voltage Vpgm2 is applied to the selected word line. Also, in a verify phase of the second program loop, the first auxiliary verify voltage Vvf1* and the first main verify voltage Vvf1 may be applied to the selected word line.

After that, in a program pulse apply phase of a third program loop, a third program voltage Vpgm3 is applied to the selected word line. Also, in a verify phase of the third program loop, the first auxiliary verify voltage Vvf1*, the first main verify voltage Vvf1, the second auxiliary verify voltage Vvf2*, and the second main verify voltage Vvf2 may be applied to the selected word line.

According to FIG. 3, it is illustrated that verification on the first program state PV1 has passed as a result obtained by performing a verify phase of a third program loop. Therefore, the first auxiliary verify voltage Vvf1* and the first main verify voltage Vvf1 might not be used in subsequent program loops. Accordingly, in a program pulse apply phase of a fourth program loop, a fourth program voltage Vpgm4 may be applied to the selected word line. Also, in a verify phase of the fourth program loop, the second auxiliary verify voltage Vvf2* and the second main verify voltage Vvf2 may be applied to the selected word line.

After that, in a program pulse apply phase of a fifth program loop, a fifth program voltage Vpgm5 may be applied to the selected word line. Also, in a verify phase of the fifth program loop, the second auxiliary verify voltage Vvf2*, the second main verify voltage Vvf2, the third auxiliary verify voltage Vvf3*, and the third main verify voltage Vvf3 may be applied to the selected word line. In this manner, program loops may be repeatedly performed until verification on the second program state PV2 and the third program state PV3 passes.

In a verify phase of each program loop, at least one auxiliary verify voltage and at least one main verify voltage may be applied to the selected word line. In particular, as shown in FIG. 3, an embodiment is illustrated, in which at least one auxiliary verify voltage and at least one main verify voltage are applied to the selected word line in an order in which the verify voltages sequentially increase from a low voltage to a high voltage. However, this is merely illustrative, and the present disclosure is not limited thereto. For example, unlike as shown in FIG. 3, at least one auxiliary verify voltage and at least one main verify voltage may be applied to the selected word line in an order in which the verify voltages sequentially decrease from a high voltage to a low voltage.

Figure 4:
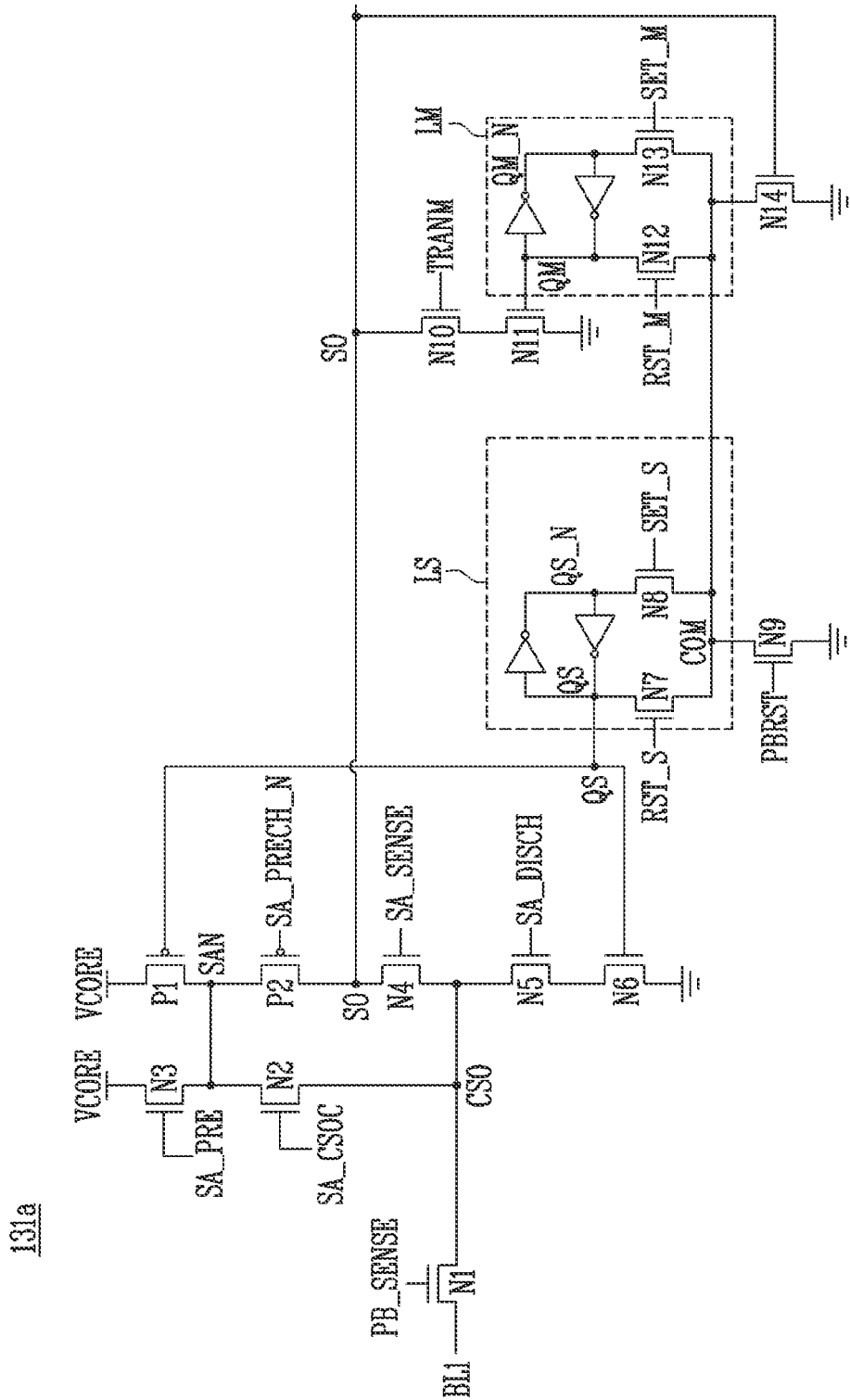
FIG. 4 is a circuit diagram illustrating an embodiment of a page buffer.

FIG. 4 is a circuit diagram illustrating an embodiment of a page buffer.

A page buffer 131a may be operated in response to a signal output from the control logic 140. Signals PB_SENSE, SA_PRECH_N, SA_SENSE, SA_CSOC, SA_PRE, SA_DISCH, RST_S, SET_S, RST_M, SET_M, TRANM, and PBRST described hereinbelow may be control signals output from the control logic 140. The page buffer 131a will be described, for example, as follows.

Referring to FIG. 4, the page buffer 131a is connected to a memory cell through a bit line BL1. Also, the page buffer 131a may include first to sixth NMOS transistor N1 to N6 and first and second PMOS transistors P1 and P2. Also, the page buffer 131a may include a sensing latch circuit LS and a main latch circuit LM. The sensing latch circuit LS may include a latch connected between nodes QS and QS_N, a seventh NMOS transistor N7 connected between the node QS and a node COM, and an eighth NMOS transistor N8 connected between the node QS_N and the node COM. A voltage value of the node QS of the sensing latch circuit LS and a voltage value of the node QS_N of the sensing latch circuit LS may be values logically inverted to each other. That is, when the voltage value of the node QS is a logic high voltage value, the voltage value of the node QS_N becomes a logic low voltage value. On the contrary, when the voltage of the node QS is a logic low voltage value, the voltage value of the node QS_N becomes a logic high voltage value.

The main latch circuit LM may include a latch connected between nodes QM and QM_N, a twelfth NMOS transistor N12 connected between a node QM and the node COM, and a thirteenth NMOS transistor N13 connected between a node QM_N and the node COM. Meanwhile, the page buffer 131a may further include ninth to eleventh NMOS transistors N9 to N11 and a fourteenth transistor N14. A voltage value of the node QM of the main latch circuit LM and a voltage value of the node QM_N of the main latch circuit LM may be values logically inverted to each other.

The first NMOS transistor N1 is connected between the bit line BL1 and a node CSO, and is controlled by a signal PB_SENSE. The third and second NMOS transistors N3 and N2 are connected in series between a power voltage VCORE and the node CSO, and are respectively controlled by signals SA_PRE and SA_CSOC. The first and second PMOS transistors P1 and P2 are connected between the power voltage VCORE and a node SO, and are respectively controlled by a voltage of the node QS and a signal SA_PRECH_N. The third NMOS transistor N3 and the first and second PMOS transistors P1 and P2 are connected to each other through a node SAN. The fourth NMOS transistor N4 is connected between the node SO and the node CSO, and is controlled by a signal SA_SENSE. The fifth and sixth NMOS transistors N5 and N6 are connected between the node CSO and a ground voltage, and are respectively controlled by a signal SA_DISCH and the voltage of the node QS.

Meanwhile, the seventh NMOS transistor N7 is connected between the node QS and the node COM, and is controlled by a signal RST_S. The eighth NMOS transistor N8 is connected between the node QS_N and the node COM, and is controlled by a signal SET_S. The twelfth NMOS transistor N12 is connected between the node QM and the node COM, and is controlled by a signal RST_M. The thirteenth NMOS transistor N13 is connected between the node QMN and the node COM, and is controlled by a signal SET_M.

The ninth NMOS transistor N9 and the fourteenth NMOS transistor N14 are connected in parallel between the node COM and the ground voltage, and are respectively controlled by a signal PBRST and a voltage of the node SO. The tenth and eleventh NMOS transistors N10 and N11 are connected in series between the node SO and the ground voltage, and are respectively controlled by a signal TRANM and a voltage of the node QM.

In a verify operation of the memory cell, the page buffer 131a first precharges the node SO. After that, the voltage of the node SO may be changed to different levels according to a threshold voltage of the memory cell connected to the bit line BL1. The node SO may be designated as a "sensing node," and therefore, an operation of precharging the node SO in the verify operation may be designated as a "sensing node precharge operation." The sensing node precharge operation of the page buffer 131a will be described with reference to FIG. 8.

Meanwhile, a case where the page buffer 131a shown in FIG. 4 includes two latch circuits LS and LM is illustrated. However, various numbers of latch circuits may be included in the page buffer, if necessary. For example, the page buffer may include three or more latch circuits.

Figure 5:
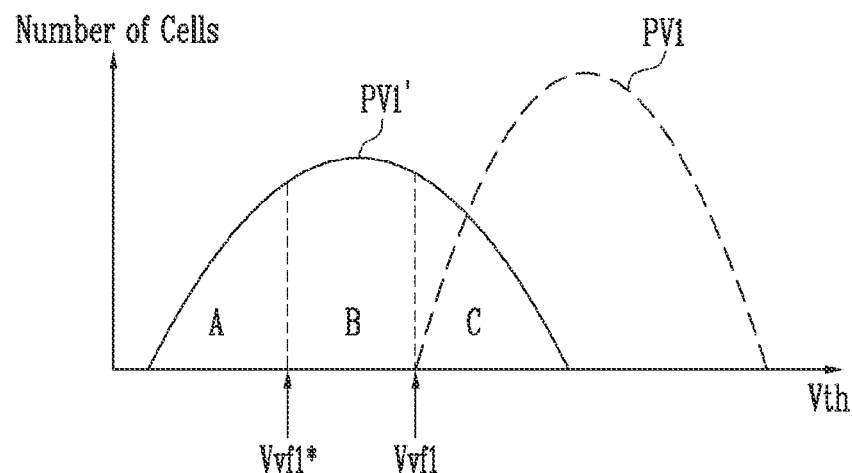
FIG. 5 is a diagram illustrating an intermediate program state PV1' during a program process of memory cells to be programmed to a first program state PV1.

FIG. 5 is a diagram illustrating an intermediate program state PV1' during a program process of memory cells to be programmed to the first program state PV1.

Referring to FIG. 5, the intermediate program state PV1' of memory cells to be programmed to the first program state PV1 as a target program state is illustrated. Before a program operation is started, a threshold voltage of the memory cells to be programmed to the first program state PV1 would be included in the erase state E. As the program operation is performed, the threshold voltage of the memory cells to be programmed to the first program state PV1 may gradually increase or increase. Accordingly, the threshold voltage of the memory cells to be programmed to the first program state PV1 may form the intermediate program state PV1' as shown in FIG. 5.

Memory cells included in the intermediate program state PV1' may be divided into three groups. A threshold voltage of memory cells of area A is lower than the first auxiliary verify voltage Vvf1*. In a subsequent program loop, the first program allow voltage may be applied to a bit line connected to the memory cells of the area A.

A threshold voltage of memory cells of area B is higher than the first auxiliary verify voltage Vvf1* and is lower than the first main verify voltage Vvf1. In a subsequent program loop, the second program allow voltage higher than the first program allow voltage may be applied to a bit line connected to the memory cells of the area B. Accordingly, when a program voltage is applied to a selected word line, a threshold voltage movement width of the memory cells of the area B is smaller than a threshold voltage movement width of the memory cells of the area A.

A threshold voltage of memory cells of area C is higher than the first main verify voltage Vvf1. In a subsequent program loop, the program inhibit voltage may be applied to a bit line connected to the memory cells of the area C. Accordingly, although the program voltage is applied to the selected word line, the threshold voltage of the memory cells of the area C might not be moved.

An auxiliary verify operation and a main verify operation may be sequentially performed to divide whether each of the memory cells to be programmed to the first program state PV1 belongs to any one of the area A, the area B, and the area C. Memory cells belonging to the area A may be divided through the auxiliary verify operation using the first auxiliary verify voltage Vvf1*. After that, memory cells belonging to the areas B and C may be divided through the main verify operation using the first main verify voltage Vvf1. As described above, a sensing node precharge operation is required to perform a verify operation. When the auxiliary verify operation and the main verify operation are sequentially performed, the sensing node precharge operation is performed in each verify operation.

Figure 6:
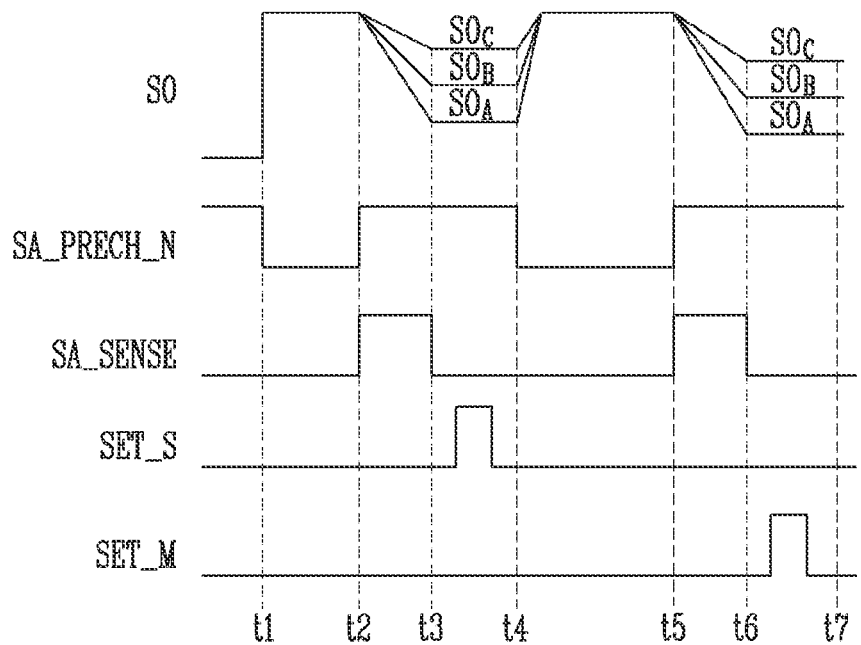
FIG. 6 is a timing diagram illustrating a verify operation using the page buffer shown in FIG. 4.

FIG. 6 is a timing diagram illustrating a verify operation using the page buffer shown in FIG. 4. In FIG. 6, signals SA_PRECH_N, SA_SENSE, SET_S, and SET_M and a voltage change of the node SO according thereto in the verify operation are illustrated, and illustration of other signals and voltages of other nodes is omitted.

At time t1, the signal SA_PRECH_N is activated to a logic low level. Accordingly, the second PMOS transistor P2 is turned on. Meanwhile, the voltage of the node QS is initialized to a logic low voltage representing "0" at the time t1, and therefore, the first PMOS transistor P1 is turned on. Accordingly, the node SO is precharged through the first and second PMOS transistors P1 and P2 from the power voltage VCORE. In this meaning, period t1 to t2 is a period in which a sensing node is precharged.

At time t2, the signal SA_PRECH_N is inactivated to a logic high level. Accordingly, the second PMOS transistor P2 is turned off. Also, at the time t2, the signal SA_SENSE is activated to the logic high level. Accordingly, the third NMOS transistor N3 is turned on. Meanwhile, during period t2 to t3, the first auxiliary verify voltage Vvf1* is applied to a selected word line, so that the voltage of the node SO is changed according to a threshold voltage of memory cells connected to each bit line. The threshold voltage of the memory cell of the area C is higher than the first auxiliary verify voltage Vvf1* and the first main verify voltage Vvf1, and therefore, a voltage of a sensing node, i.e., a node $SO_C$ of a page buffer connected to the memory cell of the area C may slowly decrease or decrease. Meanwhile, the threshold voltage of the memory cell of the area B is higher than the first auxiliary verify voltage Vvf1* but is lower than the first main verify voltage Vvf1. Accordingly, a voltage of a sensing node $SO_B$ of a page buffer connected to the memory cell of the area B may decrease faster than the sensing node $SO_C$ corresponding to the area C. Meanwhile, the threshold voltage of the memory cell of the area A is lower than the first auxiliary verify voltage Vvf1*, and therefore, a voltage of a sensing node, i.e., a node $SO_A$ of a corresponding page buffer may decrease the fastest.

After that, at time t3, the signal SA_SENSE is inactivated to the logic low level. Accordingly, the third NMOS transistor N3 is turned off, and a voltage of a node SO of each page buffer is maintained. After that, during period t3 to t4, the signal SET_S is toggled. Accordingly, bit data representing whether a threshold voltage of each memory cell is higher than the first auxiliary verify voltage Vvf1* is stored in the sensing latch circuit LS. Specifically, the logic low voltage representing "0" is stored in a node QS of a sensing latch circuit LS of the page buffer connected to the memory cells corresponding to the area A. In addition, a logic high voltage representing "1" is stored in a node QS of a sensing latch circuit LS of the page buffer connected to the memory cells corresponding to the areas B and C. In this manner, a first auxiliary verify operation is performed during period t1 to t4.

After that, like the period t1 to t2, during period t4 to t5, a sensing node precharge operation of each page is performed. After that, during period t5 to t6, the first main verify voltage Vvf1 is applied to the selected word line, so that the voltage of the sensing node of the corresponding page buffer is changed according to a threshold voltage of each memory cell. At time t6, as the signal SA_SENSE is inactivated to the logic low level, the voltage of the node SO of each page buffer is maintained. After that, during period t6 to t7, the signal SET_M is toggled. Accordingly, bit data representing whether the threshold voltage of each memory cell is higher than the first main verify voltage Vvf1 is stored in the main latch circuit LM. Specifically, the logic low voltage representing "0" is stored in a node QM of a main latch circuit LM of the page buffer connected to the memory cells corresponding to the areas A and B. In addition, the logic high voltage representing "1" is stored in a node QM of a main latch circuit LM of the page buffer connected to the memory cells corresponding to the area C. In this manner, a first main verify operation is performed during period t4 to t7.

Referring to FIG. 6, an auxiliary verify operation is performed during the period t1 to t4, and then a sensing node precharge operation for a main verify operation is performed. Referring to the embodiment shown in FIG. 6, it can be seen that, regardless of results of the auxiliary verify operation, sensing nodes of all page buffers connected to the memory cells to be programmed to the first program state PV1 are precharged. A relatively large current unnecessarily flows in a bit line connected to memory cells, i.e., the memory cells of the area A, which do not require the main verify operation, during the period t5 to t6. In an embodiment, this causes a problem in that the accuracy of a main verify operation of an adjacent memory cell is deteriorated. Hereinafter, this will be described with reference to FIGS. 6 and 7 together.

Figure 7:
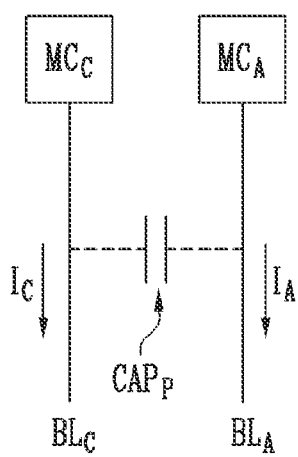
FIG. 7 is a diagram illustrating influence which a memory cell of area A has on a verify operation of a memory cell of area C when the memory cell of the area A and the memory cell of the area C are located adjacent to each other.

FIG. 7 is a diagram illustrating the influence on which a memory cell of the area A has on a verify operation of a memory cell of the area C when the memory cell of the area A and the memory cell of the area C are located adjacent to each other.

Referring to FIG. 7, a current flowing in a bit line in a main verify operation when a memory cell $MC_A$ included in the area A shown in FIG. 5 a memory cell $MC_C$ included in the area C shown in FIG. 5 are located adjacent to each other is illustrated. The memory cell $MC_A$ is connected to a bit line $BL_A$, and the memory cell $MC_C$ is connected to a bit line $BL_C$. For convenience of description, illustration of other memory cells respectively connected in a string direction to the memory cells $MC_A$ and $MC_C$ is omitted. Meanwhile, illustration of page buffers respectively connected to the bit lines $BL_A$ and $BL_C$ is omitted.

FIG. 7 illustrates a current flowing in each of the bit lines $BL_A$ and $BL_C$ during the period t5 to t6. A current $I_C$ flows in the bit line $BL_C$, and a current $I_A$ flows in the bit line $BL_A$. In the period t5 to t6 shown in FIG. 6, a voltage of a node $SO_A$ corresponding to the memory cell $MC_A$ decreases relatively faster than a voltage of a node $SO_C$ corresponding to the memory cell $MC_C$. This means that the current $I_A$ is relatively larger than the current $I_C$.

Meanwhile, since the bit lines $BL_A$ and $BL_C$ are located adjacent to each other, a parasitic capacitance $CAP_P$ component may exist between the bit lines $BL_A$ and $BL_C$. When a voltage of the bit line $BL_A$ considerably drops during the period t5 to t6, such a voltage drop has influence on a voltage of the bit line $BL_C$ located adjacent to the bit line $BL_A$.

However, the memory cells corresponding to the area A are in a state in the memory cells have already been divided through the previous period t1 to t4. That is, when during the sensing node corresponding to the memory cells corresponding to the area A is not precharged during the period t4 to t5, a problem in that sensing of adjacent memory cells becomes inaccurate due to a parasitic capacitance as described with reference to FIG. 7 might not occur.

In accordance with an embodiment of the present disclosure, in the main verify operation, a precharge operation on a sensing node of a page buffer connected to a memory cell decided to have a threshold voltage lower than an auxiliary verify voltage through an auxiliary verify operation is omitted. Accordingly, in an embodiment, in the main verify operation, the sensing accuracy of a memory cell located adjacent to the memory cell decided to have the threshold voltage lower than the auxiliary verify voltage can be improved.

Figure 8:
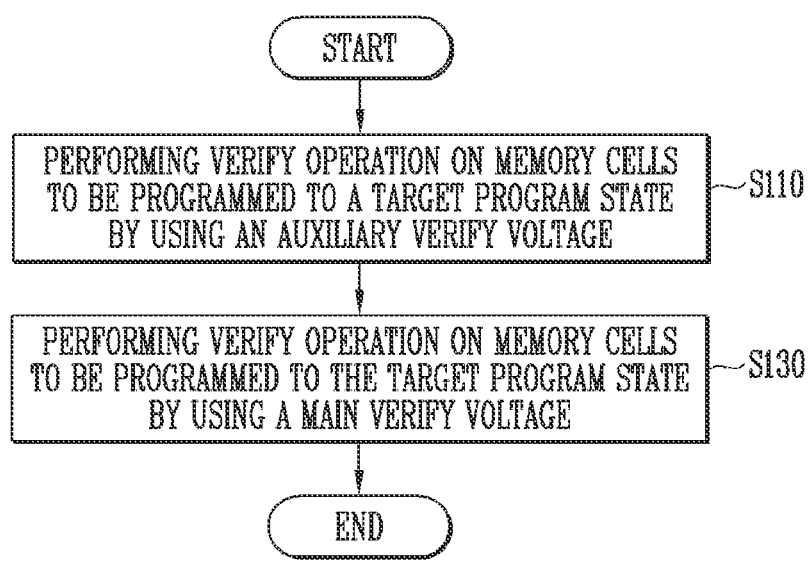
FIG. 8 is a flowchart illustrating an operating method of the semiconductor memory device in accordance with an embodiment of the present disclosure.

FIG. 8 is a flowchart illustrating an operating method of the semiconductor memory device in accordance with an embodiment of the present disclosure.

Referring to FIG. 8, the operating method of the semiconductor memory device in accordance with the embodiment of the present disclosure includes step S110 of performing a verify operation on memory cells to be programmed to a target program state by using an auxiliary verify voltage and step S130 of performing a verify operation on the memory cells to be programmed to the target program state by using a main verify voltage.

For example, the target program state may be the first program state PV1. In step S110, an auxiliary verify operation on memory cells to be programmed to the first program state PV1 among memory cell selected as a program target may be performed using a first auxiliary verify voltage. Through step S110, memory cells A of which threshold voltage is lower than the first auxiliary verify voltage Vvf1* and memory cells B and C of which threshold voltage is higher than the auxiliary verify voltage Vvf1* may be divided.

After that, in step S130, a main verify operation on the memory cells to be programmed to the first program state PV1 may be performed using a first main verify voltage. Through step S130, memory cells B of which threshold voltage is lower than the first main verify voltage Vvf1 and memory cells C of which threshold voltage is higher than the first main verify voltage Vvf1 may be divided.

As described above, both the auxiliary verify operation and the main verify operation may include a sensing node precharge operation of a page buffer. Step S110 may include a sensing node precharge operation of all page buffers connected to the memory cells to be programmed to the first program state PV1. On the other hand, according to the operating method of the semiconductor memory device in accordance with an embodiment of the present disclosure, the step S130 may include an operation of precharging only a sensing node of a page buffer connected to the memory cells B and C decided to have a threshold voltage higher than the first auxiliary verify voltage Vvf1* as a result obtained by performing step S110 among the memory cells to be programmed to the first program state PV1. That is, in step S130, a sensing node precharge operation of a page buffer connected to the memory cells A having a threshold voltage lower than the first auxiliary verify voltage Vvf1* might not be performed. Hereinafter, this will be described with reference to FIGS. 9 and 10.

Figure 9:
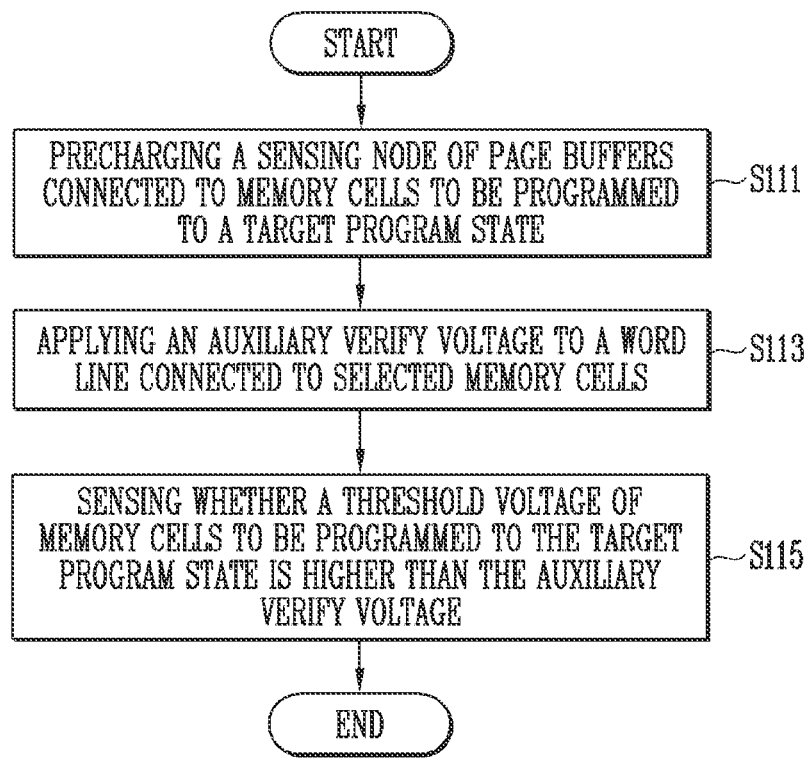
FIG. 9 is a flowchart illustrating an embodiment of step S110 shown in FIG. 8.

FIG. 9 is a flowchart illustrating an embodiment of the step S110 shown in FIG. 8.

Referring to FIG. 9, the step S110 includes step S111 of precharging a sensing node of a page buffer connected to the memory cells to be programmed to the target program state, step S113 of applying the auxiliary verify voltage to a word line connected to selected memory cells, and step S115 of sensing whether a threshold voltage of the memory cells to be programmed to the target program state is higher than the auxiliary verify voltage.

For example, in step S111, sensing nodes of page buffers connected to the memory cells to be programmed to the first program state PV1 may all be precharged. After that, in step S113, the first auxiliary verify voltage Vvf1* may be applied to a word line connected to the memory cells selected as the program target. After that, in step S115, it may be sensed whether a threshold voltage of each of the memory cells to be programmed to the first program state PV1 is higher than the first auxiliary verify voltage Vvf1*. That is, through the steps S111, S113, and S115, memory cells of which threshold voltage is lower than the first auxiliary verify voltage Vvf1* and memory cells B and C of which threshold voltage is higher than the first auxiliary verify voltage Vvf1* may be divided.

Figure 10:
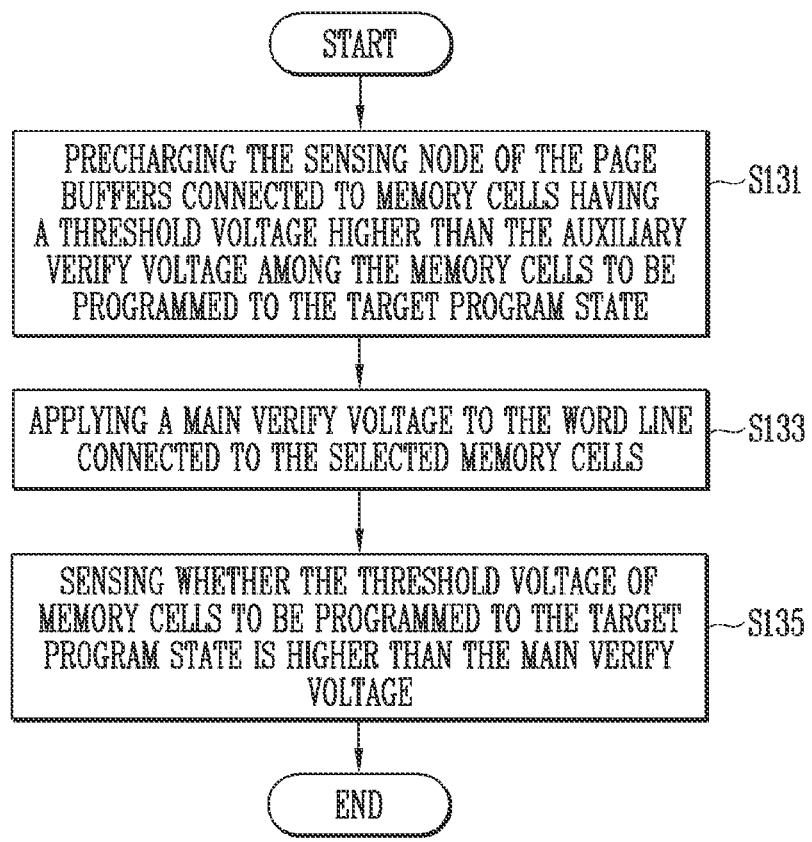
FIG. 10 is a flowchart illustrating an embodiment of step S130 shown in FIG. 8.

FIG. 10 is a flowchart illustrating an embodiment of the step S130 shown in FIG. 8.

Referring to FIG. 10, the step S130 includes step S131 of precharging a sensing node of a page buffer connected to memory cells having a threshold voltage higher than the auxiliary verify voltage among the memory cells to be programmed to the target program state, step S133 of applying the main verify voltage to a word line connected to selected memory cells, and step S135 of sensing whether a threshold voltage of the memory cells to be programmed to the target program state is higher than the main verify voltage.

For example, in the step S131, sensing nodes $SO_B$ and $SO_C$ of a page buffer connected to memory cells B and C decided to have a threshold voltage higher than the first auxiliary verify voltage Vvf1* in the previous auxiliary verify step S110 among the memory cells to be programmed to the first program state PV1 may be precharged. In step S131, sensing nodes $SO_A$ of a page buffer connected to memory cells A decided to have a threshold voltage lower than the first auxiliary verify voltage Vvf1* in the previous auxiliary verify step S110 are not precharged.

After that, in step S133, the first main verify voltage Vvf1 may be applied to a word line connected to the memory cells selected as the program target. After that, in step S135, it may be sensed whether a threshold voltage of each of the memory cells to be programmed to the first program state PV1 is higher than the first main verify voltage Vvf1. Specifically, in the step S133, it may be sensed whether a threshold voltage each of memory cells B and C decided to have a threshold voltage higher than the first auxiliary verify voltage Vvf1* in the previous auxiliary verify step S110 is higher than the first main verify voltage Vvf1.

That is, through the steps S131, S133, and S135, the memory cells B and C decided to have the threshold voltage higher than the first auxiliary verify voltage Vvf1* in the previous auxiliary verify step S110 may be divided into memory cells B of which threshold voltage is lower than the first main verify voltage Vvf1 and memory cells C of which threshold voltage is higher than the first main verify voltage Vvf1.

Figure 11:
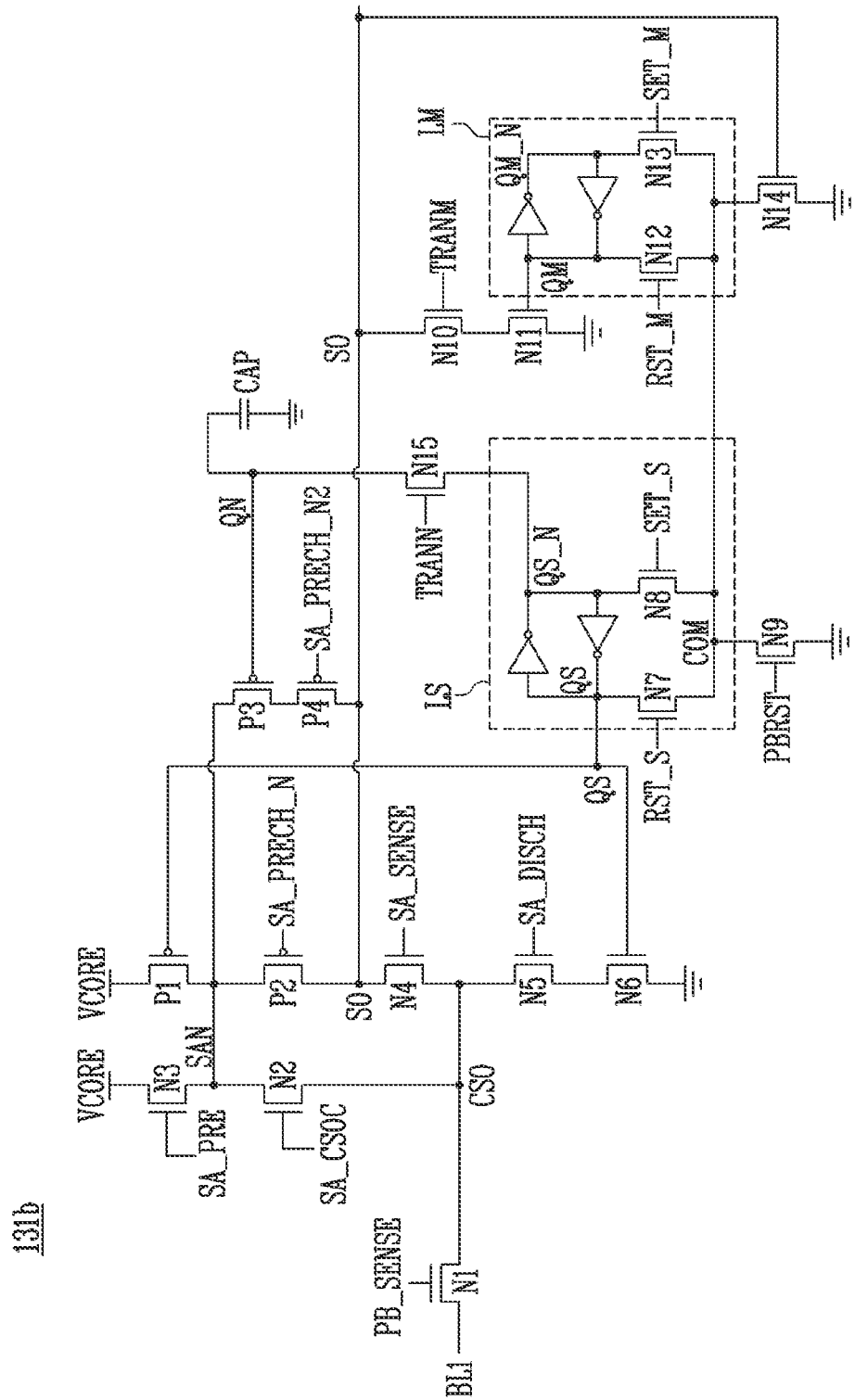
FIG. 11 is a circuit diagram illustrating a page buffer in accordance with an embodiment of the present disclosure.

FIG. 11 is a circuit diagram illustrating a page buffer in accordance with an embodiment of the present disclosure. FIG. 11 is an embodiment of a page buffer for performing the method shown in FIGS. 8 to 10. The present disclosure is not limited to the circuit diagram shown in FIG. 11, and different circuits having various structures may be applied to perform the method shown in FIGS. 8 to 10.

Referring to FIG. 11, third and fourth PMOS transistors P3 and P4, a fifteenth NMOS transistor N15, and a capacitor CAP are added to the circuit shown in FIG. 4. The other components are substantially identical to the components of the circuit diagram shown in FIG. 4, and therefore, overlapping descriptions will be omitted.

The third and fourth PMOS transistors P3 and P4 are connected in series between the node SAN and the node SO. Meanwhile, the third PMOS transistor P3 is controlled by a voltage of a node QN. In addition, the fourth PMOS transistor P4 is controlled by a signal SA_PRECH_N2. Meanwhile, the capacitor CAP is connected between the node QN and the ground voltage.

Meanwhile, the fifteenth NMOS transistor N15 is connected between a gate of the third PMOS transistor P3 and the node QS_N. The fifteenth NMOS transistor N15 is controlled by a signal TRANN. Meanwhile, the fifteenth NMOS transistor N15 is connected to the gate of the third PMOS transistor P3 through the node QN.

Referring to FIG. 11, the capacitor CAP is additionally formed between the node QN and the ground voltage. However, this is merely illustrative, and the capacitor is not to be necessarily manufactured. For example, a parasitic capacitance formed between the node QN and another conductive line may be used to serve as the capacitor CAP. In addition, although a case where the capacitor CAP is connected to the ground voltage is illustrated in FIG. 11, this is merely illustrative, and the present disclosure is not limited thereto. The capacitor CAP may be connected to another voltage instead of the ground voltage.

In an embodiment of the present disclosure, a result of the auxiliary verify operation is stored in the sensing latch circuit LS. After that, in the sensing node precharge operation of the main verify operation, the fourth PMOS transistor P4 and the fifteenth NMOS transistor N15 are controlled through the signals SA_PRECH_N2 and TRANN, so that sensing nodes can be selectively precharged according to a value of the node QS_N. Hereinafter, this will be described with reference to FIGS. 12A and 12B.

Figure 12A:
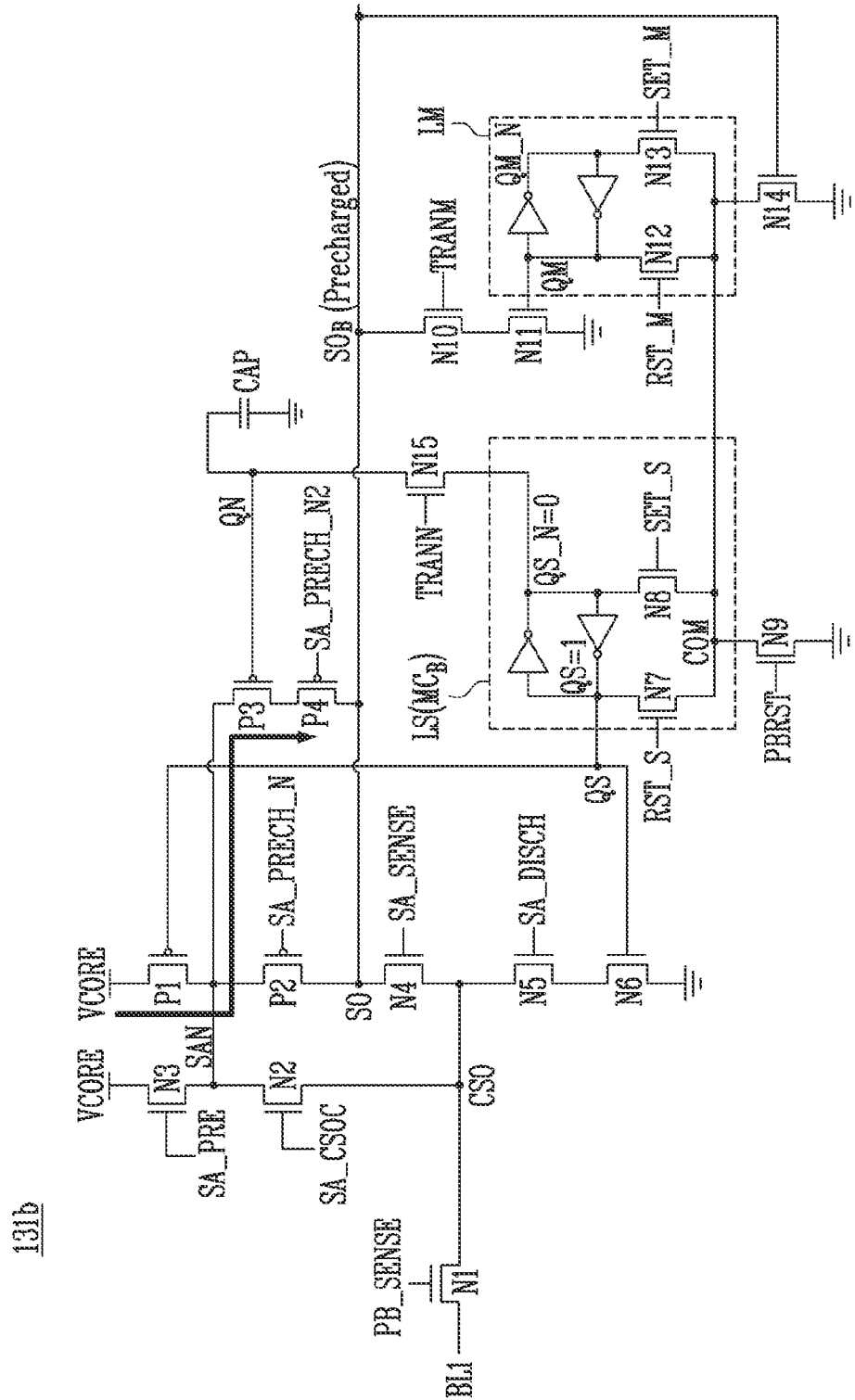
FIG. 12A is a diagram illustrating an operation of a page buffer connected to a memory cell of area B in a main verify operation.

FIG. 12A is a diagram illustrating an operation of a page buffer connected to a memory cell of the area B in a main verify operation. Although the operation of the page buffer connected to the memory cell of the area B is described, an operation of a page buffer connected to a memory cell of the area C is also the same.

The memory cell of the area B or C is decided to have a threshold voltage higher than the first auxiliary verify voltage in the auxiliary verify operation. Accordingly, a voltage of the node QS of the sensing latch circuit LS is a logic high voltage representing a bit value of "1," and a voltage of the node QS_N is a logic low voltage representing a bit value of "0."

First, the signal TRANN is increased to the logic high level, thereby turning on the fifteenth NMOS transistor N15. Accordingly, a voltage of the node QN connected to the capacitor CAP also becomes the logic low voltage due to the node QS_N having the logic low voltage. Accordingly, the third PMOS transistor P3 is turned on. After the voltage of the node QS_N is transferred to the node QN, the voltage of the node QS of the sensing latch circuit LS is initialized to the logic low voltage having the bit value of "0."

After that, the signal SA_PRECH_N2 is dropped to the logic low level, thereby turning on the fourth PMOS transistor P4. Since the node QS of the sensing latch circuit LS has the logic low voltage, the first PMOS transistor P1 may also be turned on.

Since the first PMOS transistor P1, the third PMOS transistor P3, and the fourth PMOS transistor P4 are turned on, a current path is formed between the power voltage VCORE and the sensing node $SO_B$ as indicated by an arrow. Accordingly, the sensing node $SO_B$ of the page buffer connected to the memory cell of the area B is precharged. The sensing node $SO_C$ of the page buffer connected to the memory cell of the area C may also be precharged in the same manner.

Figure 12B:
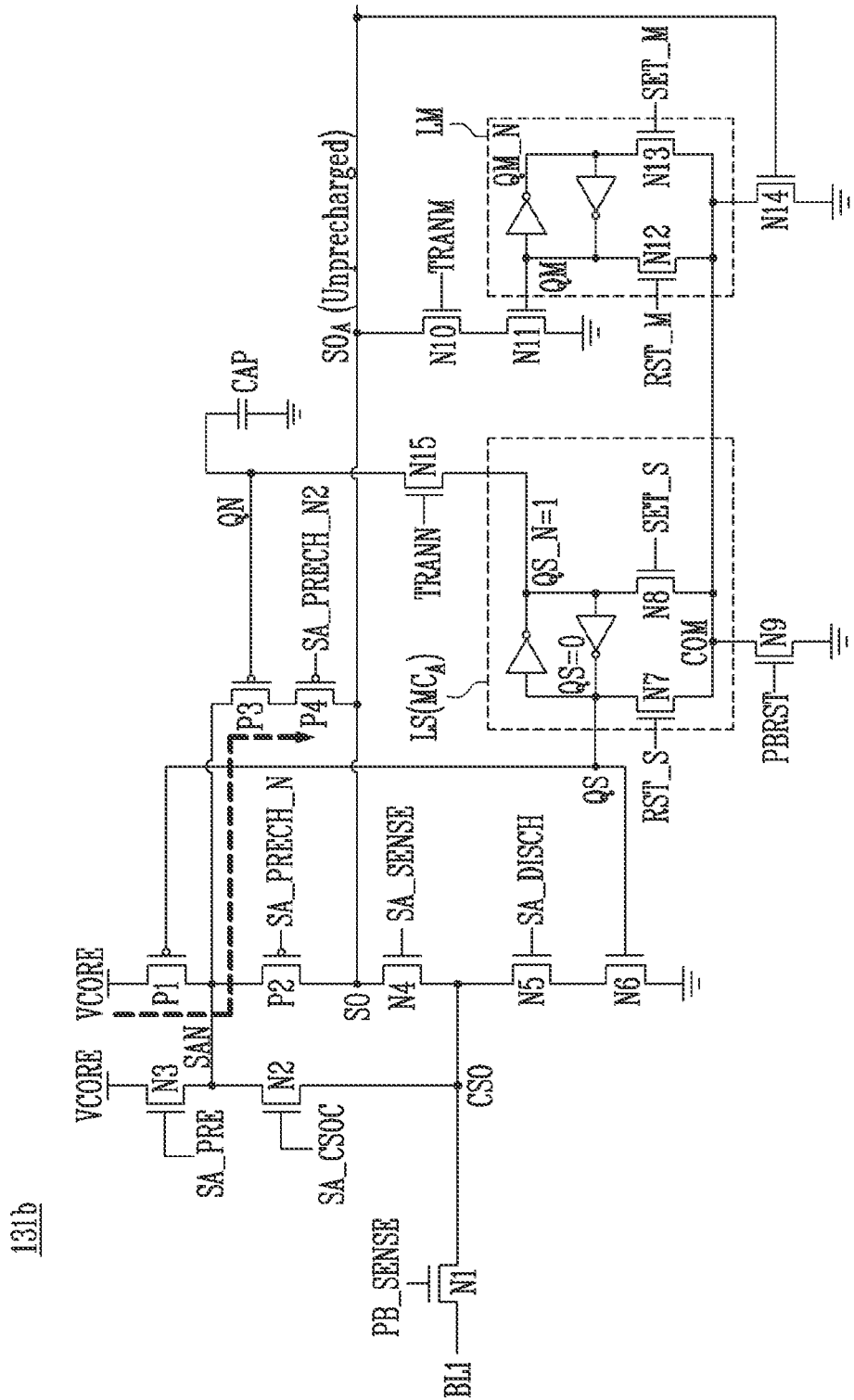
FIG. 12B is a diagram illustrating an operation of a page buffer connected to the memory cell of the area A in the main verify operation.

FIG. 12B is a diagram illustrating an operation of a page buffer connected to the memory cell of the area A in the main verify operation.

The memory cell of the area A is decided to have a threshold voltage lower than the first auxiliary verify voltage in the auxiliary verify operation. Accordingly, the voltage of the node QS of the sensing latch circuit LS is a logic low voltage representing a bit value of "0," and the voltage of the node QS_N is a logic high voltage representing a bit value of "1."

First, the signal TRANN is increased to the logic high level, thereby turning on the fifteenth NMOS transistor N15. Accordingly, a voltage of the node QN connected to the capacitor CAP also becomes the logic high voltage due to the node QS_N having the logic high voltage. Accordingly, the third PMOS transistor P3 is turned off. After the voltage of the node QS_N is transferred to the node QN, the voltage of the node QS of the sensing latch circuit LS is initialized to the logic low voltage having the bit value of "0."

After that, the signal SA_PRECH_N2 is dropped to the logic low level, thereby turning on the fourth PMOS transistor P4. Since the node QS of the sensing latch circuit LS has the logic low voltage, the first PMOS transistor P1 may also be turned on.

Since the third PMOS transistor P3 is turned off, any current path is not formed between the power voltage VCORE and the sensing node $SO_A$ even when the first PMOS transistor P1 and the fourth PMOS transistor P4 are turned on. Accordingly, the sensing node $SO_A$ of the page buffer connected to the memory cell of the area A is not precharged.

Referring to FIGS. 12A and 12B, in the sensing node precharge of the main verify operation, a result of the auxiliary verify operation is used. Accordingly, in an embodiment, a sensing node of a page buffer connected to a memory cell which does not require the main verify operation, i.e., a memory cell decided to have a threshold voltage lower than the auxiliary verify voltage is not precharged. Thus, in an embodiment, the sensing accuracy of the main verify operation on a memory cell located adjacent to a memory cell having a threshold voltage lower than the auxiliary verify voltage can be improved.

Figure 13:
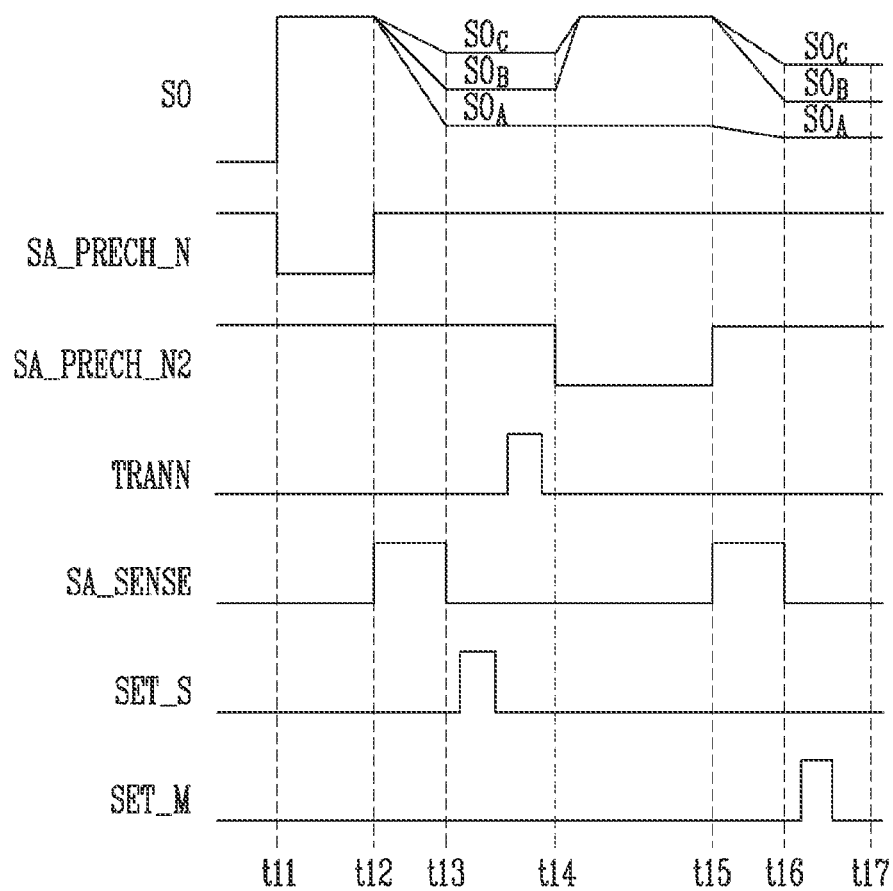
FIG. 13 is a timing diagram illustrating a verify operation using the page buffer shown in FIG. 11.

FIG. 13 is a timing diagram illustrating a verify operation using the page buffer shown in FIG. 11.

In FIG. 13, signals SA_PRECH_N, SA_PRECH_N2, TRANN, SA_SENSE, SET_M, and SET_S and a voltage change of the node SO according thereto in the verify operation are illustrated, and illustration of other signals and voltages of other nodes is omitted.

During period t11 to t14, a first auxiliary verify operation is performed on memory cells to be programmed to the first program state PV1.

At time t11, the signal SA_PRECH_N is activated to a logic low level. Accordingly, the second PMOS transistor P2 is turned on. Meanwhile, the voltage of the node QS is initialized to a logic low voltage representing "0" at the time t11, and therefore, the first PMOS transistor P1 is turned on. Accordingly, the node SO is precharged through the first and second PMOS transistors P1 and P2 from the power voltage VCORE.

At time t12, the signal SA_PRECH_N is inactivated to a logic high level. Accordingly, the second PMOS transistor P2 is turned off. Also, at the time t2, the signal SA_SENSE is activated to the logic high level. Accordingly, the fifth NMOS transistor N5 is turned on. Meanwhile, during period t12 to t13, the first auxiliary verify voltage Vvf1* is applied to a selected word line, so that the voltage of the node SO is changed according to a threshold voltage of memory cells connected to each bit line. As described above with reference to FIGS. 5 to 7, the voltage of the sensing node is differently changed according to an area to which a threshold voltage of a memory cell belongs.

After that, at time t13, the signal SA_SENSE is inactivated to the logic low level. Accordingly, the fifth NMOS transistor N5 is turned off, and a voltage of a node SO of each page buffer is maintained. After that, during period t13 to t14, the signal SET_S is toggled. Accordingly, bit data representing whether a threshold voltage of each memory cell is higher than the first auxiliary verify voltage Vvf1* is stored in the sensing latch circuit LS. Specifically, the logic low voltage representing "0" is stored in a node QS of a sensing latch circuit LS of the page buffer connected to the memory cells corresponding to the area A. In addition, a logic high voltage representing "1" is stored in a node QS of a sensing latch circuit LS of the page buffer connected to the memory cells corresponding to the areas B and C. In this manner, the first auxiliary verify operation is performed during period t11 to t14.

Meanwhile, during the period t13 to t14, after the signal SET_S is toggled, the signal TRANN may be toggled. As the signal TRANN is toggled, the voltage of the QS_N is transferred to the node QN. As described above with reference to FIGS. 12A and 12B, a voltage of a node QN of a page buffer connected to a memory cells belonging to the areas B and C becomes the logic low voltage, and a voltage of a node QN of a page buffer connected to a memory cell belonging to the area A becomes the logic high voltage.

After that, a sensing node precharge operation is performed in period t14 to t15. As described above with reference to FIGS. 12A and 12B, during the period t14 to t15, only sensing nodes $SO_B$ and $SO_C$ of page buffers corresponding to memory cells belonging to the areas B and C are precharged, and sensing nodes $SO_A$ of page buffers corresponding to memory cells belonging to the area A are not precharged.

Specifically, at time t14, the signal SA_PRECH_N2 drops to the logic low level, and accordingly, the fourth PMOS transistor P4 is turned on. Meanwhile, the third PMOS transistor P3 is selectively turned on according to the voltage of the node QN. That is, a third PMOS transistor P3 of a page buffer connected to a memory cell belonging to the areas B and C is turned on, and a third PMOS transistor P3 of a page buffer connected to a memory cell belonging to the area A is turned off. Therefore, sensing nodes $SO_B$ and $SO_C$ of page buffers corresponding to memory cells belonging to the areas B and C are precharged, and a sensing node $SO_A$ of a page buffer corresponding to a memory cell belonging to the area A are not precharged.

After that, during period t15 to t16, a sensing node voltage of a corresponding page buffer is changed according to a threshold voltage of each memory cell. Specifically, at time t15, the signal SA_PRECH_N2 is inactivated to the logic high level. Accordingly, the fourth PMOS transistor P4 is turned off. Also, at the time t15, the signal SA_SENSE is activated to the logic high level. Accordingly, the fifth NMOS transistor N5 is turned on. Meanwhile, during the period t15 to t16, the first main verify voltage Vvf1 is applied to a selected word line, so that the voltage of the sensing node SO is changed according to a threshold voltage of memory cells connected to each bit line.

At time t16, as the signal SA_SENSE is inactivated to the logic low level, a voltage of a node SO of each page buffer is maintained. After that, during period t16 to t17, the signal SET_M is toggled. Accordingly, bit data representing whether a threshold voltage of each memory cell is higher than the first main verify voltage Vvf1 is stored in the main latch circuit LM.

Meanwhile, although an embodiment in which a main sensing result is stored in the main latch circuit LM is illustrated in FIG. 13, the main sensing result may be stored in the sensing latch circuit LS. During the period t16 to t17, the signal SET_S may be toggled instead of the signal SET_M. Accordingly, the bit data representing whether the threshold voltage of each memory cell is higher than the first main verify voltage Vvf1 may be stored in the sensing latch circuit LS.

Referring to FIGS. 6 and 13 together, while sensing nodes $SO_A$, $SO_B$, and $SO_C$ of page buffers corresponding to memory cells belonging to the areas A, B, and C are all precharged during the period t4 to t5 shown in FIG. 6, sensing nodes $SO_A$ of page buffers corresponding to memory cells belonging to the area A are not precharged during the period t14 to t15 shown in FIG. 13. Thus, in an embodiment, the sensing accuracy of the main verify operation on a memory cell located adjacent to a memory cell having a threshold voltage lower than the auxiliary verify voltage can be improved.

Figure 14:
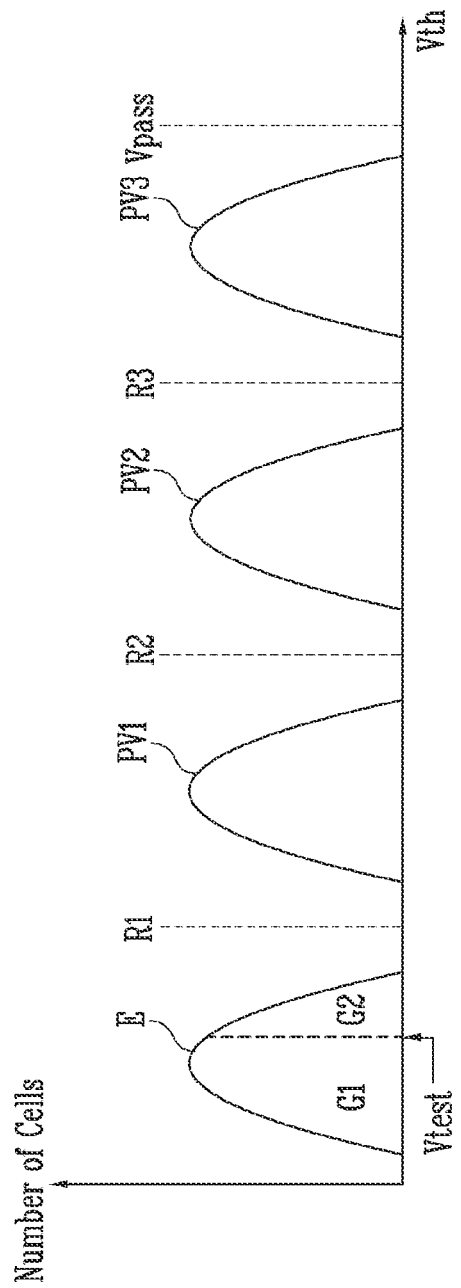
FIG. 14 is a diagram illustrating a method of dividing memory cells in an erase state into a first group and a second group in accordance with another embodiment of the present disclosure.

FIG. 14 is a diagram illustrating a method of dividing memory cells in the erase state into a first group and a second group in accordance with another embodiment of the present disclosure.

Referring to FIG. 14, memory cells of which target program state is the erase state E may be divided into a first group G1 and a second group G2. A threshold voltage of memory cells belonging to the first group G1 is lower than a test voltage Vtest. Meanwhile, a threshold voltage of memory cells belonging to the second group G2 is higher than the test voltage Vtest.

During a program operation of memory cells corresponding to the first to third program states PV1 to PV3, a threshold voltage of the memory cells corresponding to the erase state E may increase due to disturbance. That is, during the program operation, the memory cells corresponding to the erase state E maintains a program inhibit state, but the threshold voltage of the memory cells corresponding to the erase state E may be influenced by a program voltage repeatedly applied to a selected word line.

The threshold voltage of the memory cells belonging to the first group G1 is located relatively distant from a first read voltage R1. Therefore, in an embodiment, the memory cells belonging to the first group G1 has a relatively low probability that a read error will occur even when the threshold voltage slightly increases due to program disturbance.

On the other hand, the threshold voltage of memory cells belonging to the second group G2 is located relatively close to the first read voltage R1. The memory cells belonging to the second group G2 has a relatively high probability that a read error will occur when the threshold voltage increases due to program disturbance.

Accordingly, in an embodiment, in order to reduce influence caused by disturbance in the program operation, it is necessary to apply a higher program inhibit voltage to a bit line connected to the memory cells belonging to the second group G2. According to a semiconductor memory device and an operating method thereof in accordance with another embodiment of the present disclosure, a voltage of first bit lines connected to the memory cells belonging to the first group G1 is set to a first program inhibit voltage, and a voltage of second bit lines connected to the memory cells belonging to the second group G2 is set to a second program inhibit voltage higher than the first program inhibit voltage.

To this end, a sensing result using the test voltage Vtest may be stored in the capacitor CAP shown in FIG. 11. Specifically, the sensing result using the test voltage Vtest is first stored in the sensing latch circuit LS, and then the fifteenth NMOS transistor N15 is turned on through the signal TRANN, thereby selectively charging the capacitor CAP according to data stored in the sensing latch circuit LS. That is, the voltage of the node QN may be changed according to the sensing result using the test voltage Vtest.

Meanwhile, in the program operation, the voltage of the second bit lines is first increased, and then the voltage of the first bit lines is increased. Accordingly, a voltage of second bit lines located adjacent to the first bit lines among the second bit lines may increase to the second program inhibit voltage due to coupling. By using the voltage of the node QN, the voltage of the second bit lines is first increased, and then the voltage of the first bit lines may be increased. Hereinafter, the semiconductor memory device and the operating method thereof in accordance with the another embodiment of the present disclosure will be described with reference to FIGS. 15 to 18.

Figure 15:
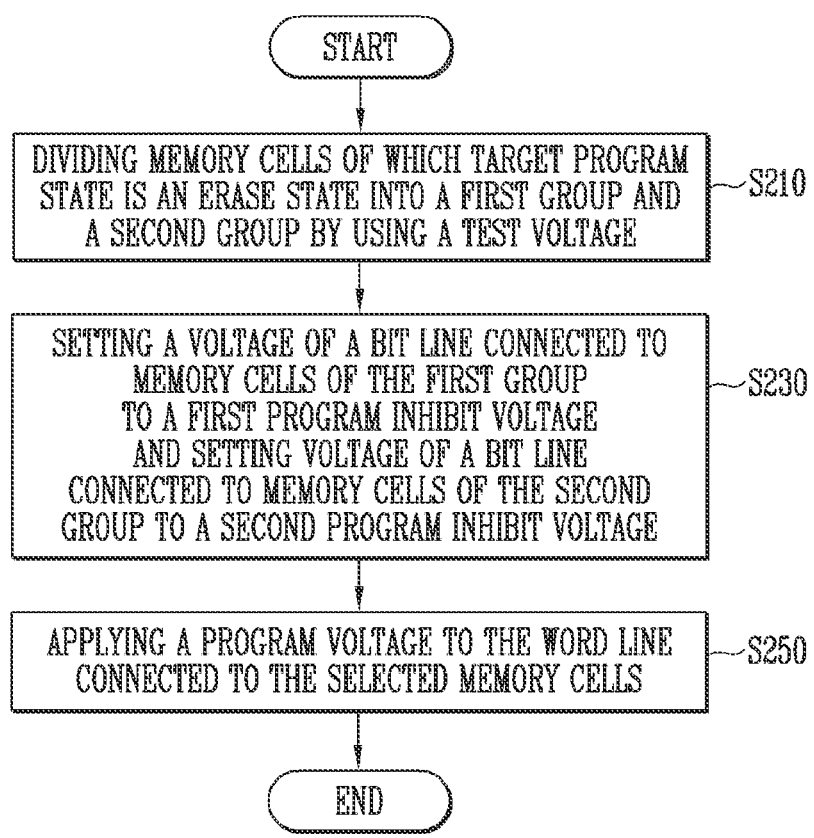
FIG. 15 is a flowchart illustrating an operating method of the semiconductor memory device in accordance with another embodiment of the present disclosure.

FIG. 15 is a flowchart illustrating an operating method of the semiconductor memory device in accordance with another embodiment of the present disclosure.

Referring to FIG. 15, the operating method of the semiconductor memory device in accordance with the another embodiment of the present disclosure includes step S210 of dividing memory cells of which target program state is an erase state into a first group and a second group by using a test voltage, step S230 of setting a voltage of a bit line connected to memory cells of the first group to a first program inhibit voltage and setting a voltage of a bit line connected to memory cells of the second group to a second program inhibit voltage, and step S250 of applying a program voltage to a word line connected to selected memory cells.

In step S210, memory cells of which target program state is the erase state E are divided into a first group G1 and a second group G2 by using a test voltage Vtest. Step S210 may be performed in a manner similar to a manner of the above-described auxiliary verify operation. In the above-described auxiliary verify operation, memory cells A of which threshold voltage is lower than the first auxiliary verify voltage and memory cells B and C of which threshold voltage is higher than the first auxiliary verify voltage are divided using the first auxiliary verify voltage Vvf1*. That is, a bit value representing whether a threshold voltage of memory cells is higher than the first auxiliary verify voltage Vvf1* is stored in the sensing latch circuit LS of the page buffer.

In a similar manner, in the step S210, memory cells of the first group G1, of which threshold voltage is lower than the test voltage Vtest, and memory cells of the second group G2, of which threshold voltage is higher than the test voltage Vtest, are divided using the test voltage Vtest. That is, a bit value representing whether a threshold voltage of memory cells is higher than the test voltage Vtest may be stored in the sensing latch circuit LS of the page buffer.

Also, in step S210, a sensing result using the test voltage Vtest may be stored in the capacitor CAP shown in FIG. 11 as described above. That is, the voltage of the node QN may be changed according to the sensing result using the test voltage Vtest.

In the step S230, a voltage of first bit lines connected to the memory cells belonging to the first group G1 is set to a first program inhibit voltage, and a voltage of second bit lines connected to the memory cells belonging to the second group G2 is set to a second program inhibit voltage higher than the first program inhibit voltage. The voltage of the second bit lines is first increased, and then the voltage of the first bit lines is increased. Accordingly, a voltage of second bit lines located adjacent to the first bit lines among the second bit lines may increase to the second program inhibit voltage due to coupling.

Figure 16:
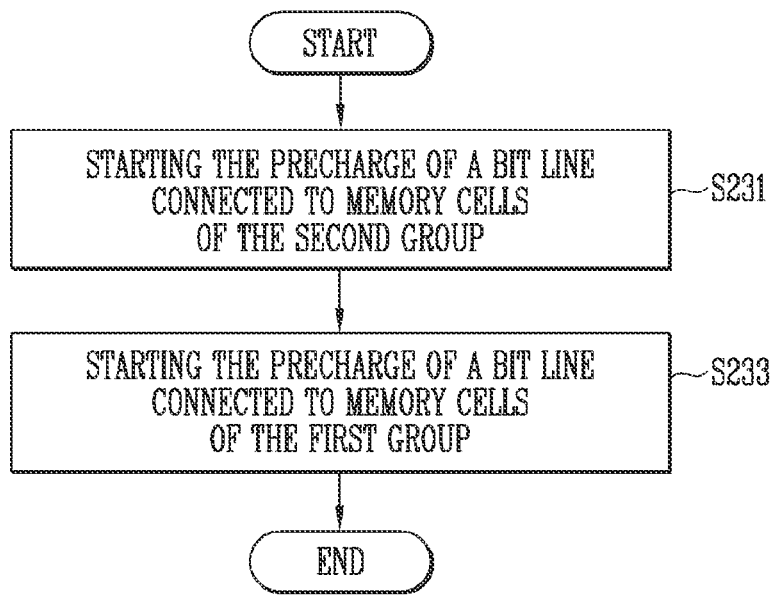
FIG. 16 is a flowchart illustrating an embodiment of step S230 shown in FIG. 15.
Figure 17:
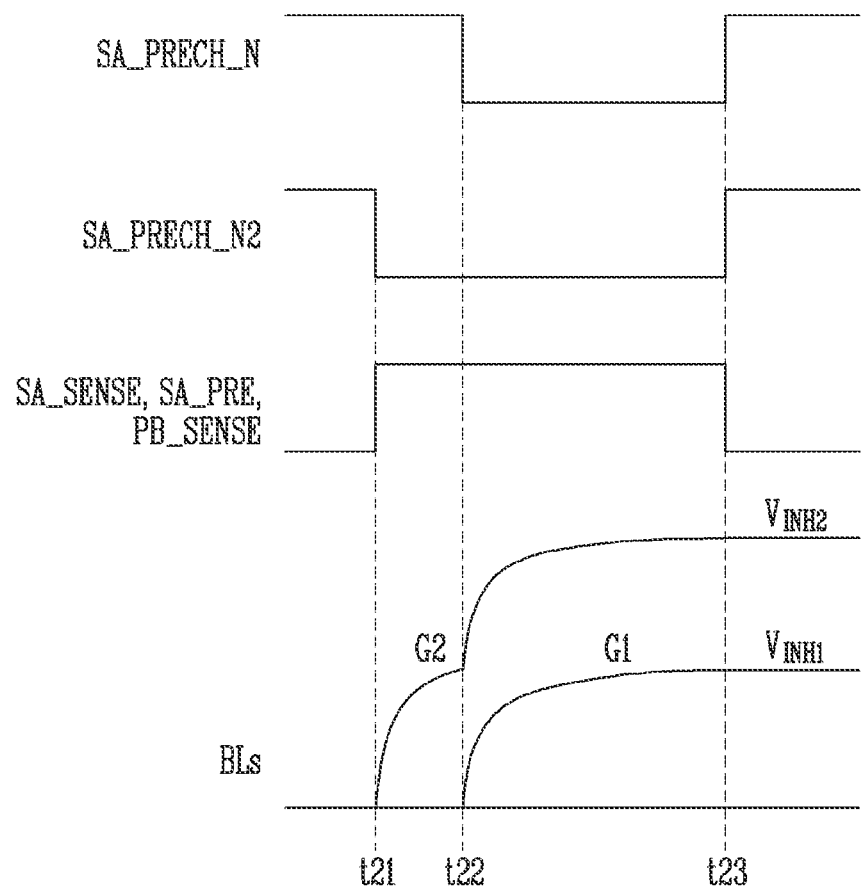
FIG. 17 is a timing diagram illustrating a method of performing steps S231 and S233 shown in FIG. 16, using the page buffer shown in FIG. 11.
Figure 18:
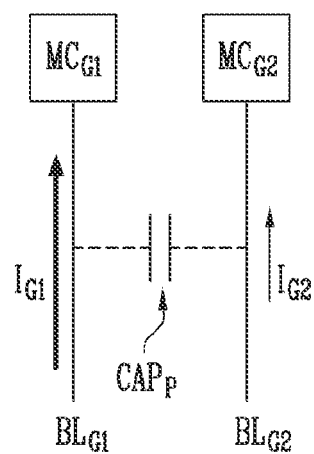
FIG. 18 is a diagram illustrating a voltage increase of a bit line connected to memory cells of the second group during period t22 to t23 shown in FIG. 17.

FIG. 16 is a flowchart illustrating an embodiment of the step S230 shown in FIG. 15. FIG. 17 is a timing diagram illustrating a method of performing the steps S231 and S233 shown in FIG. 16, using the page buffer shown in FIG. 11. FIG. 18 is a diagram illustrating a voltage increase of a bit line connected to the memory cells of the second group during period t22 to t23 shown in FIG. 17. Hereinafter, the step S230 shown in FIG. 15 will be described with reference to FIGS. 11, 16, 17, and 18 together.

Referring to FIG. 16, step S230 includes step S231 of starting the precharge of a bit line connected to the memory cells of the second group G2 and step S233 of starting the precharge of a bit line connected to the memory cells of the first group G1.

Referring to FIG. 17, at time t21, the signals SA_PRE, SA_SENSE, and PB_SENSE are activated to a logic high level, and the signal SA_PRECH_N2 is activated to a logic low level. Accordingly, the first, third, and fourth NMOS transistors N1, N3, and N4 and the fourth PMOS transistors P4 are turned on.

Meanwhile, a result on whether a threshold voltage of each memory cell is higher than the test voltage Vtest may be stored in the sensing latch circuit LS. That is, when the threshold voltage of the memory cell is higher than the test voltage Vtest, the voltage of the node QS_N may be a logic high voltage. Accordingly, when the signal TRANN is activated, the third PMOS transistor P3 is turned on.

Consequently, when the threshold voltage of the memory cell is higher than the test voltage Vtest, i.e., when the memory cell corresponds to the second group G2, a third NMOS transistor N3, a third PMOS transistor P3, a fourth PMOS transistor P4, a fourth NMOS transistor N4, and a first NMOS transistor N1, which are included in a corresponding page buffer, are all turned on. Accordingly, at the time t21, a voltage of a bit line connected to a memory cell corresponding to the second group G2 starts increasing.

On the other hand, when the threshold voltage of the memory cell is lower than the test voltage Vtest, the voltage of the node QS_N may be a logic low voltage. Accordingly, when the signal TRANN is activated, the third PMOS transistor P3 is turned off.

Consequently, when the threshold voltage of the memory cell is lower than the test voltage Vtest, i.e., when the memory cell corresponds to the first group G1, a third NMOS transistor N3, a fourth PMOS transistor P4, a fourth NMOS transistor N4, and a first NMOS transistor N1, which are included in a corresponding page buffer, are turned on, but a third PMOS transistor P3 included in the corresponding page buffer is turned off. Accordingly, a voltage of a bit line connected to a memory cell corresponding to the first group G1 does not increase.

After that, at time t22, the signal SA_PRECH_N is activated to the logic low level. Accordingly, the second PMOS transistor P2 is turned on. Therefore, regardless of data stored in the sensing latch circuit LS, the bit line is precharged through the third NMOS transistor N3, the second PMOS transistor P2, the fourth NMOS transistor N4, and the first NMOS transistor N1.

Accordingly, the voltage of the bit lines connected to the memory cells belonging to the first group G1 starts increasing. At the time t22, the voltage of the bit lines connected to the memory cells belonging to the first group G1 rapidly increases at 0V. Accordingly, as shown in FIG. 18, a current $I_{G1}$ flowing in a bit line $BL_{G1}$ connected to memory cells $MC_{G1}$ belonging to the first group G1 has a relatively large value. On the other hand, at the time t22, the voltage of the bit lines connected to the memory cells belonging to the second group G2 is in a state in which the voltage has already increased sufficiently. Accordingly, as shown in FIG. 18, a current $I_{G2}$ flowing in a bit line $BL_{G2}$ connected to memory cells $MC_{G2}$ belonging to the second group G2 has a relatively small value.

Meanwhile, as shown in FIG. 18, when the memory cells $MC_{G1}$ belonging to the first group G1 and the memory cells $MC_{G2}$ belonging to the second group G2 are located adjacent to each other, a voltage of the bit line $BL_{G2}$ connected to the memory cells $MC_{G2}$ belonging to the second group G2 may further increase due to coupling, as a voltage of the bit line $BL_{G1}$ connected to the memory cells $MC_{G1}$ belonging to the first group G1 rapidly increases. Since the bit line $BL_{G1}$ and the bit line $BL_{G2}$ are located adjacent to each other, a parasitic capacitance CAPP component may exist between the first bit line $BL_{G1}$ and the bit line $BL_{G2}$.

As the voltage of the bit line $BL_{G1}$ connected to the memory cells $MC_{G1}$ belonging to the first group G1 increased up to a first program inhibit voltage $V_{INH1}$, the voltage of the bit line $BL_{G2}$ connected to the memory cells $MC_{G2}$ belonging to the second group G2 may further increase up to a second program inhibit voltage $V_{INH2}$ due to influence of the parasitic capacitance $CAP_P$ component. On the other hand, a voltage of bit lines $BL_{G2}$ connected to memory cells $MC_{G2}$ belonging to the second group G2, which are not located adjacent to the memory cells $MC_{G1}$ belonging to the first group G1 may increase to only the first program inhibit voltage $V_{INH1}$.

In this manner, according to the semiconductor memory device and the operating method thereof in accordance with the another embodiment of the present disclosure, the voltage of the first bit lines connected to the memory cells belonging to the first group G1 is set to the first program inhibit voltage $V_{INH1}$, and the voltage of the second bit lines connected to the memory cells belonging to the second group G2 is set to the second program inhibit voltage $V_{INH2}$ higher than the first program inhibit voltage $V_{INH1}$. The voltage of the second bit lines is first increased, and then the voltage of the first bit lines is increased. Accordingly, in an embodiment, the voltage of second bit lines located adjacent to the first bit lines among the second bit lines may increase to the second program inhibit voltage due to coupling.

In accordance with an embodiment of the present disclosure, there can be provided a semiconductor memory device and an operating method thereof, which can improve sensing accuracy in a verify process of a program operation.

In accordance with an embodiment of the present disclosure, there can be provided a semiconductor memory device and an operating method thereof, which can reduce disturbance of a program operation.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A semiconductor memory device comprising:
   a memory cell array including a plurality of memory cells;
   a peripheral circuit including a plurality of page buffers each performing an auxiliary verify operation and a main verify operation, which are used to program selected memory cells among the plurality of memory cells to a target program state; and
   control logic configured to control the auxiliary verify operation and the main verify operation of the peripheral circuit,
   wherein, during the main verify operation of the target program state, the control logic controls the peripheral circuit to selectively precharge sensing nodes of the plurality page buffers respectively corresponding to the selected memory cells, based on a result of the auxiliary verify operation of the target program state.

2. The semiconductor memory device of claim 1, wherein the control logic controls the peripheral circuit not to precharge a sensing node of a page buffer corresponding to memory cells having a threshold voltage lower than an auxiliary verify voltage among the selected memory cells.

3. The semiconductor memory device of claim 2, wherein the page buffer includes:
   a sensing latch circuit configured to store the result of the auxiliary verify operation;
   a first transistor connected between a power voltage and a first node;
   second and third transistors connected in series between the first node and the sensing node; and
   a fourth transistor connected between a gate of the second transistor and a second node of the sensing latch circuit.

4. The semiconductor memory device of claim 3, wherein the first to third transistors are PMOS transistors, and the fourth transistor is an NMOS transistor.

5. The semiconductor memory device of claim 3, wherein a gate of the first transistor is connected to a third node of the sensing latch circuit, and a voltage value of the second node and a voltage value of the third node are values logically inverted to each other.

6. The semiconductor memory device of claim 3, wherein the second transistor of a page buffer connected to a memory cell of the plurality of memory cells having a threshold voltage higher than the auxiliary verify voltage is turned on.

7. The semiconductor memory device of claim 3, wherein the second transistor of a page buffer connected to a memory cell of the plurality of memory cells having a threshold voltage lower than the auxiliary verify voltage is turned off.

8. The semiconductor memory device of claim 3, wherein the control logic controls the peripheral circuit to precharge a sensing node of a page buffer connected to a memory cell of the plurality of memory cells having a threshold voltage higher than the auxiliary verify voltage by turning on the first and third transistors, and not to precharge a sensing node of a page buffer connected to memory cells having a threshold voltage lower than the auxiliary verify voltage.

9. A method of operating a semiconductor memory device, the method comprising:
performing an auxiliary verify operation on memory cells to be programmed to a target program state among memory cells selected as a program target by using an auxiliary verify voltage; and
performing a main verify operation on the memory cells to be programmed to the target program state by using a main verify voltage higher than the auxiliary verify voltage,
wherein the performing of the main verify operation includes selectively precharging sensing nodes of a plurality of page buffers respectively corresponding to the memory cells to be programmed to the target program state, based on a result of the auxiliary verify operation.

10. The method of claim 9, wherein the performing of the auxiliary verify operation includes:
precharging sensing nodes of page buffers connected to the memory cells to be programmed to the target program state;
applying the auxiliary verify voltage to a word line connected to the memory cells to be programmed to the target program state; and
sensing whether a threshold voltage of the memory cells to be programmed to the target program state is higher than the auxiliary verify voltage.

11. The method of claim 10, wherein the precharging of the sensing nodes includes:
initializing a first node of a latch included in each of the page buffers; and
turning on at least one transistor connected between a power voltage and the sensing node by using a voltage value of the first node.

12. The method of claim 11, wherein the sensing of whether the threshold voltage of the memory cells to be programmed to the target program state is higher than the auxiliary verify voltage includes:
selectively changing a voltage value of the sensing node by connecting the sensing node of each of the page buffers to corresponding bit line the sensing node; and
setting a value of the first node of the latch, based on the voltage value of the sensing node.

13. The method of claim 9, wherein the performing of the main verify operation includes:
precharging a sensing node of a page buffer connected to a memory cell having a threshold voltage higher than the auxiliary verify voltage among the memory cells to be programmed to the target program state;
applying the main verify voltage to a word line connected to the memory cells to be programmed to the target program state; and
sensing whether threshold voltages of the memory cells to be programmed to the target program state is higher than the main verify voltage.

14. The method of claim 13, wherein the precharging of the sensing node includes turning on at least one transistor connected between a power voltage and the sensing node by using a voltage value of a first node of a first latch included in each of the page buffers.

15. The method of claim 14, wherein the sensing of whether the threshold voltage of the memory cells to be programmed to the target program state is higher than the main verify voltage includes:
selectively changing a voltage value of the sensing node by connecting the sensing node of each of the page buffers to corresponding bit line; and
setting a value of the first node of the first latch, based on the voltage value of the sensing node.

16. The method of claim 14, wherein the sensing of whether the threshold voltage of the memory cells to be programmed to the target program state is higher than the main verify voltage includes:
selectively changing a voltage value of the sensing node by connecting the sensing node of each of the page buffers to corresponding bit line; and
setting a value of a third node of a second latch, based on the voltage value of the sensing node.

17. A semiconductor memory device comprising:
a memory cell array including a plurality of memory cells;
a peripheral circuit connected to the plurality of memory cells through bit lines, the peripheral circuit including a plurality of page buffers performing a program operation on selected memory cells among the plurality of memory cells; and
control logic configured to control the program operation of the peripheral circuit,
wherein, during the program operation, the control logic controls the peripheral circuit to:
divide memory cells corresponding to an erase state among the selected memory cells into first memory cells having a threshold voltage lower than a test voltage and second memory cells having a threshold voltage higher than the test voltage by performing a sensing operation using the test voltage;
precharge bit lines connected to the first memory cells to a first voltage level;
precharge bit lines connected to the second memory cells to a second voltage level higher than the first voltage level; and
apply a program voltage to a word line connected to the selected memory cells.

18. The semiconductor memory device of claim 17, wherein each page buffer of the plurality of page buffers includes:
a sensing latch circuit configured to store a result of a sensing operation using the test voltage;
a first transistor connected between a power voltage and a first node;
second and third transistors connected in series between the first node and a sensing node;
a fourth transistor connected between a gate of the second transistor and a second node of the sensing latch circuit;
a fifth transistor connected between the first node and the sensing node; and
at least one internal transistor connected between the sensing node and the bit line.

19. The semiconductor memory device of claim 18, wherein, at a first time, the control logic increases a voltage of bit lines connected to the second memory cells to an intermediate voltage level by turning on the first transistor, the third transistor, and the at least one internal transistor and turning off the fifth transistor, and wherein, at a second time, the control logic increases a voltage of bit lines connected to the first memory cells to the first voltage level, and increases the voltage of the bit lines connected to the second memory cells from the intermediate voltage level to the second voltage level through coupling.

* * * * *